United States Patent
Baker

(10) Patent No.: US 11,562,246 B2
(45) Date of Patent: Jan. 24, 2023

(54) ASYNCHRONOUS AGENTS WITH LEARNING COACHES AND STRUCTURALLY MODIFYING DEEP NEURAL NETWORKS WITHOUT PERFORMANCE DEGRADATION

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 17/664,898

(22) Filed: May 25, 2022

(65) Prior Publication Data

US 2022/0284295 A1    Sep. 8, 2022

Related U.S. Application Data

(63) Continuation of application No. 17/653,006, filed on Mar. 1, 2022, now Pat. No. 11,392,832, which is a
(Continued)

(51) Int. Cl.
*G06N 3/08* (2006.01)
*G06N 3/04* (2006.01)

(52) U.S. Cl.
CPC .......... *G06N 3/082* (2013.01); *G06N 3/0445* (2013.01); *G06N 3/084* (2013.01)

(58) Field of Classification Search
CPC ....... G06N 3/0445; G06N 3/082; G06N 3/084
See application file for complete search history.

(56) References Cited

U.S. PATENT DOCUMENTS 5,214,746 A    5/1993   Fogel et al.
9,015,093 B1   4/2015   Commons
(Continued)

FOREIGN PATENT DOCUMENTS

WO    2015162050 A1    10/2015
WO    2016132145 A1    8/2016
(Continued)

OTHER PUBLICATIONS

Smith, Leslie N., Emily M. Hand, and Timothy Doster. "Gradual DropIn of Layers to Train Very Deep Neural Networks." 2016 IEEE Conference on Computer Vision and Pattern Recognition (CVPR). IEEE, 2016. (Year: 2016).*
(Continued)

*Primary Examiner* — Benjamin P Geib
(74) *Attorney, Agent, or Firm* — K&L Gates LLP

(57) ABSTRACT

Methods and computer systems improve a trained base deep neural network by structurally changing the base deep neural network to create an updated deep neural network, such that the updated deep neural network has no degradation in performance relative to the base deep neural network on the training data. The updated deep neural network is subsequently training. Also, an asynchronous agent for use in a machine learning system comprises a second machine learning system ML2 that is to be trained to perform some machine learning task. The asynchronous agent further comprises a learning coach LC and an optional data selector machine learning system DS. The purpose of the data selection machine learning system DS is to make the second stage machine learning system ML2 more efficient in its learning (by selecting a set of training data that is smaller but sufficient) and/or more effective (by selecting a set of training data that is focused on an important task). The learning coach LC is a machine learning system that assists the learning of the DS and ML2. Multiple asynchronous agents could also be in communication with each others, each trained and grown asynchronously under the guidance of their respective learning coaches to perform different tasks.

10 Claims, 18 Drawing Sheets

Output Node with Multiple Detectors and Rejecters

Related U.S. Application Data continuation of application No. 16/618,910, filed as application No. PCT/US2018/035275 on May 31, 2018, now Pat. No. 11,295,210.

(60) Provisional application No. 62/515,142, filed on Jun. 5, 2017.

(56) References Cited

U.S. PATENT DOCUMENTS

| | | |
|---|---|---|
| 2004/0059695 A1 | 3/2004 | Xiao et al. |
| 2007/0271075 A1 | 11/2007 | Chen et al. |
| 2008/0077544 A1 | 3/2008 | Sureka |
| 2008/0183685 A1 | 7/2008 | He et al. |
| 2011/0098999 A1 | 4/2011 | Amini et al. |
| 2011/0190657 A1 | 8/2011 | Zhou et al. |
| 2013/0238533 A1 | 9/2013 | Virkar et al. |
| 2014/0236578 A1 | 8/2014 | Malon et al. |
| 2015/0106310 A1 | 4/2015 | Birdwell et al. |
| 2015/0324689 A1 | 11/2015 | Wierzynski et al. |
| 2015/0363197 A1 | 12/2015 | Carback, III et al. |
| 2016/0132786 A1 | 5/2016 | Balan et al. |
| 2016/0155049 A1* | 6/2016 | Choi .................. G06N 3/084 706/16 |
| 2016/0217367 A1 | 7/2016 | Moreno et al. |
| 2016/0335550 A1 | 11/2016 | Achin et al. |
| 2016/0364522 A1 | 12/2016 | Frey et al. |
| 2017/0068888 A1 | 3/2017 | Chung et al. |
| 2017/0109628 A1 | 4/2017 | Gokmen et al. |
| 2018/0336465 A1 | 11/2018 | Kim et al. |
| 2019/0095798 A1 | 3/2019 | Baker |
| 2019/0108445 A1 | 4/2019 | Huang et al. |
| 2019/0171947 A1 | 6/2019 | Mohan et al. |
| 2019/0197550 A1 | 6/2019 | Sharma |
| 2020/0012923 A1 | 1/2020 | Ghosh et al. |
| 2020/0134451 A1 | 4/2020 | Baker |
| 2020/0184337 A1 | 6/2020 | Baker |
| 2020/0285939 A1 | 9/2020 | Baker |

FOREIGN PATENT DOCUMENTS

| | | |
|---|---|---|
| WO | 2017062635 A1 | 4/2017 |
| WO | 2018175098 A1 | 9/2018 |
| WO | 2018194960 A1 | 10/2018 |
| WO | 2018226492 A1 | 12/2018 |
| WO | 2018226527 A1 | 12/2018 |
| WO | 2018231708 A2 | 12/2018 |
| WO | 2019005507 A1 | 1/2019 |
| WO | 2019005611 A1 | 1/2019 |
| WO | 2019067236 A1 | 4/2019 |
| WO | 2019067248 A1 | 4/2019 |
| WO | 2019067281 A1 | 4/2019 |
| WO | 2019067542 A1 | 4/2019 |
| WO | 2019067831 A1 | 4/2019 |
| WO | 2019067960 A1 | 4/2019 |
| WO | 2019152308 A1 | 8/2019 |

OTHER PUBLICATIONS

Coop, Robert, and Itamar Arel. "Mitigation of catastrophic interference in neural networks using a fixed expansion layer." 2012 IEEE 55th International Midwest Symposium on Circuits and Systems (MWSCAS). IEEE, 2012. (Year: 2012).*

International Search Report and Written Opinion for International PCT Application No. PCT/US2018/035275 dated Oct. 15, 2018.

International Preliminary Report on Patentability for International Application No. PCT/US2018/035275 dated Dec. 10, 2019.

Smith et al., Gradual DropIn of Layers to Train Very Deep Neural Networks, 2016 IEEE Conference on Computer Vision and Pattern Recognition (Jun. 27, 2016), pp. 4763-4771.

Supplementary European Search Report for corresponding European Patent Application No. EP1881395.1, dated Feb. 10, 2021.

* cited by examiner

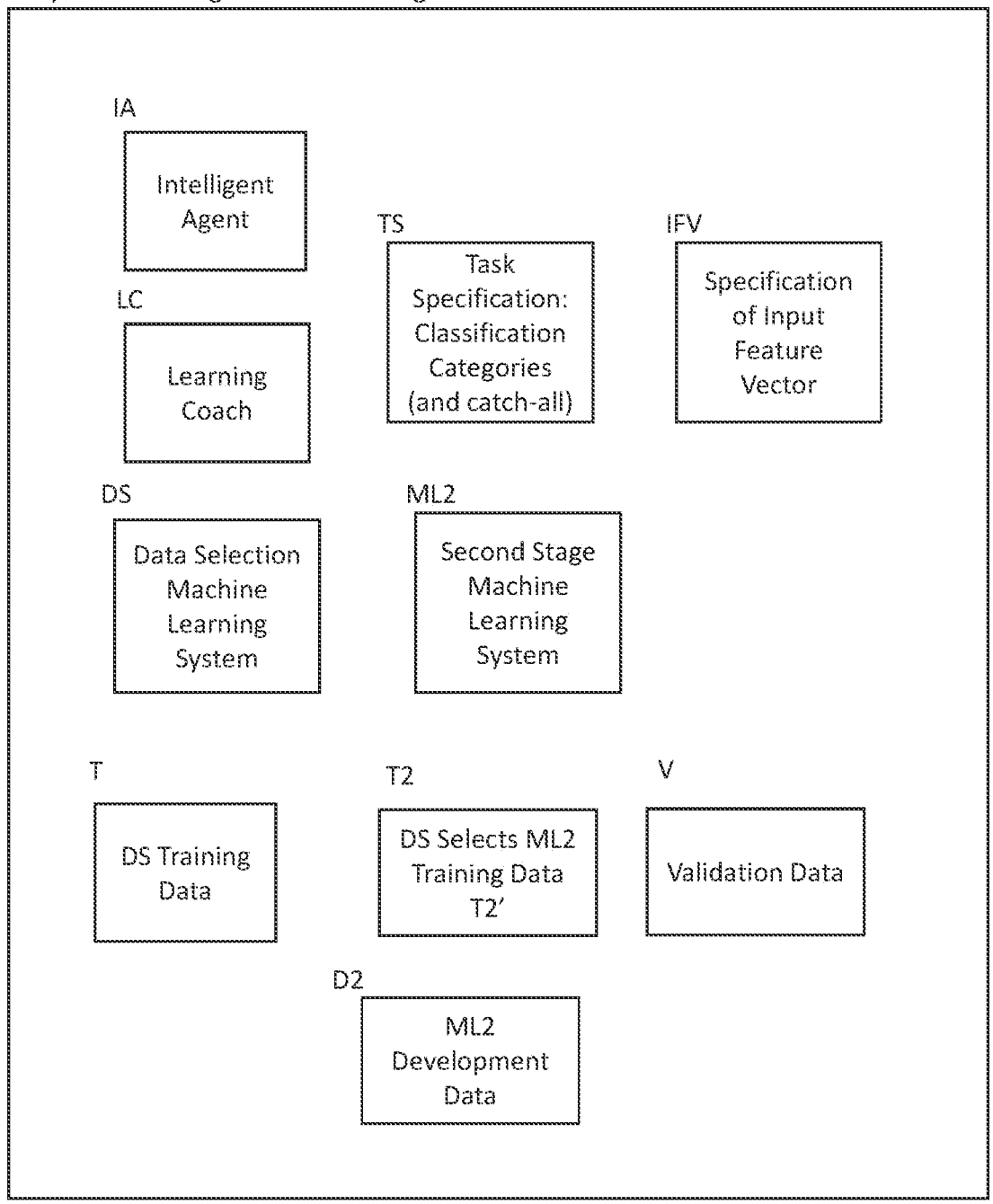
Figure 1: An Asynchronous Agent with Learning Coach

Figure 2: System with Multiple AALCs
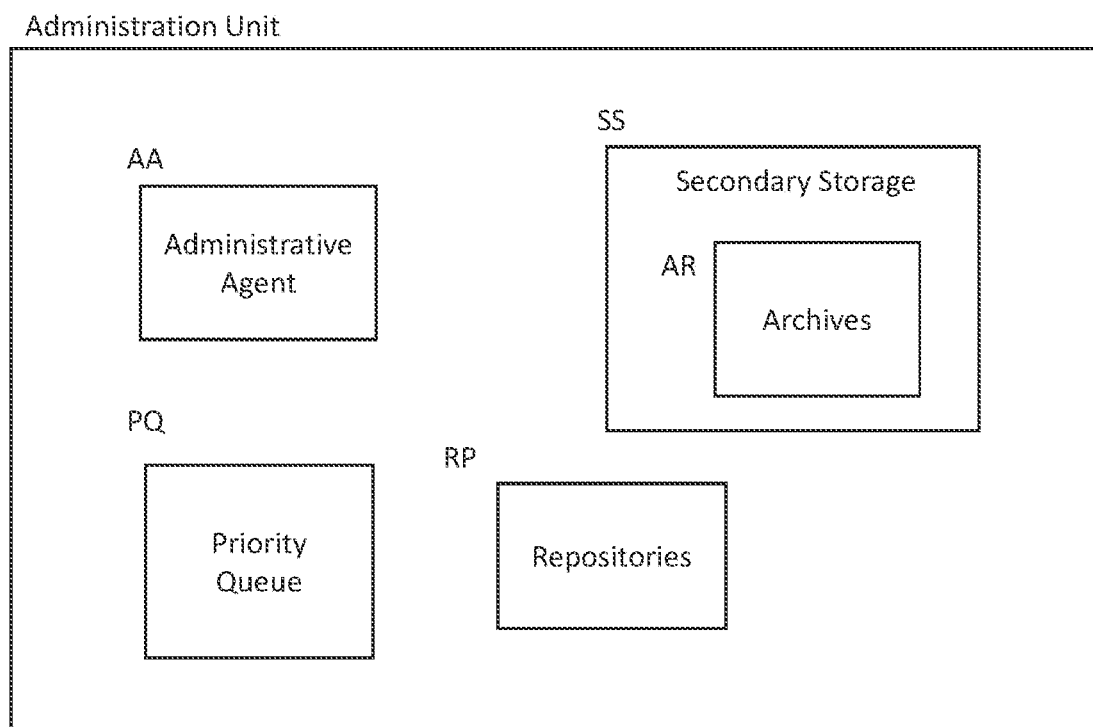
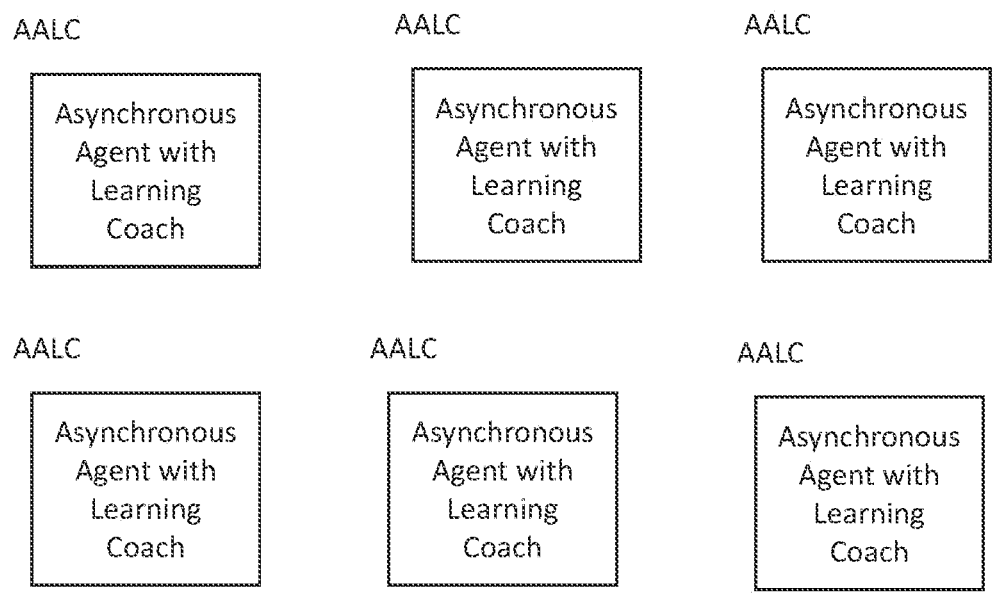

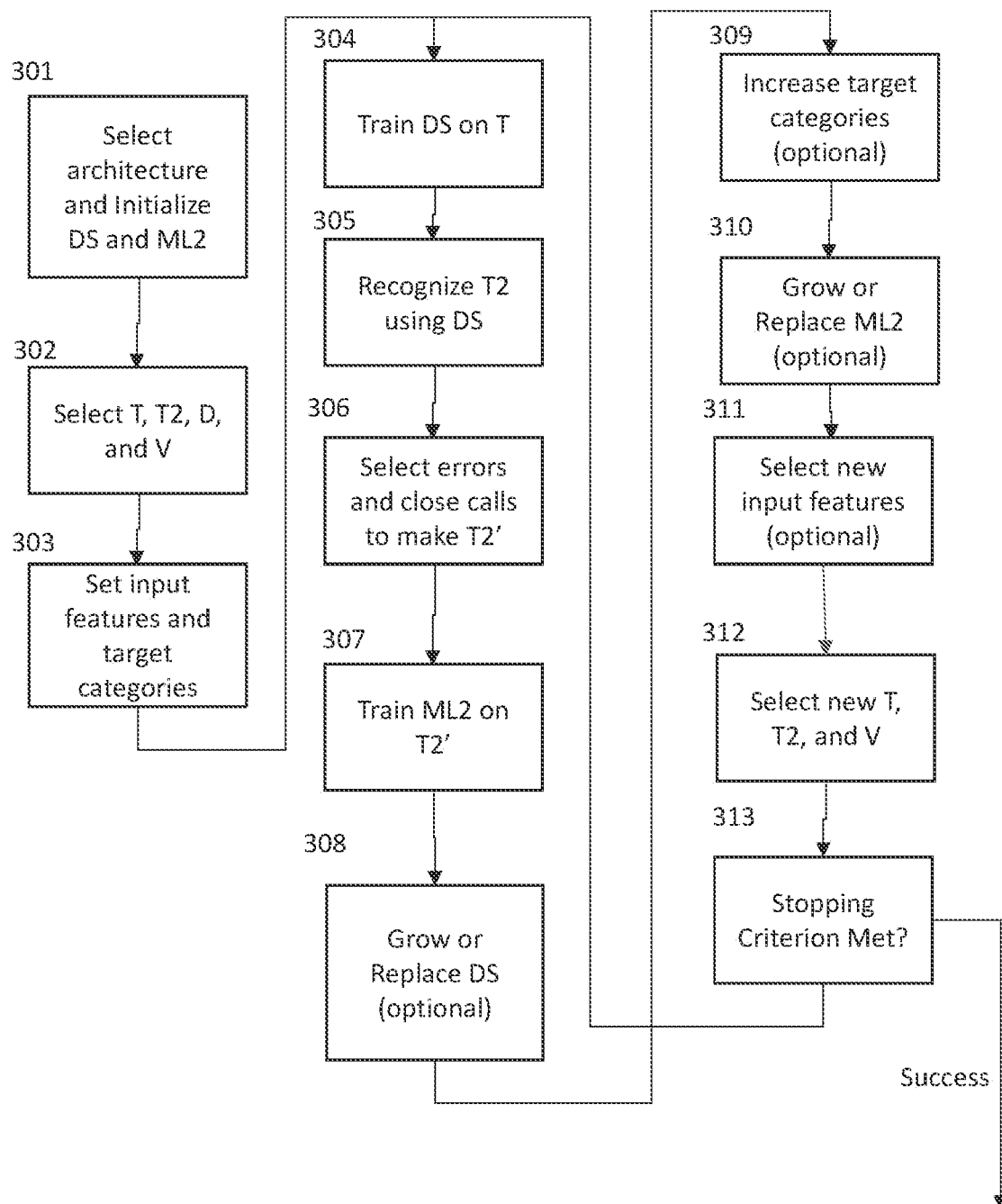
Figure 3: Incremental Learning and Growth

Figure 4: Combining an Ensemble into a Single Deep Neural Network
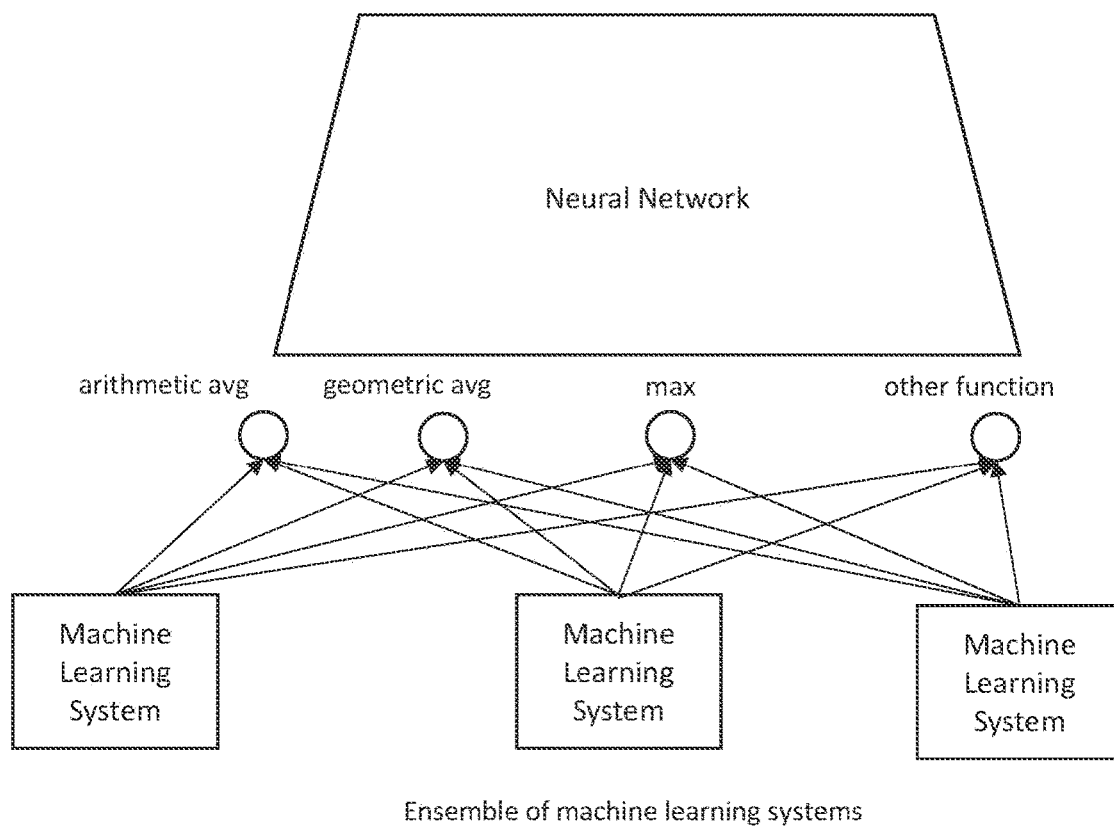

Figure 5: Adding an Arc to a Deep Neural Network Without Degrading Performance
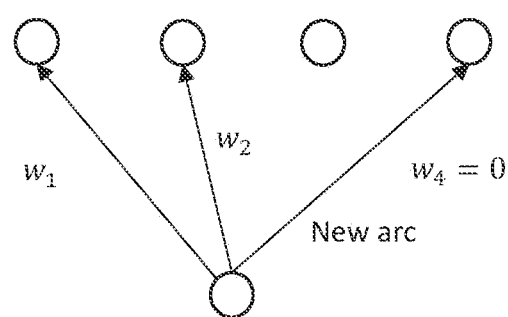

Figure 6: Adding a Node to an Existing Layer in a Deep Neural Network Without Degrading Performance
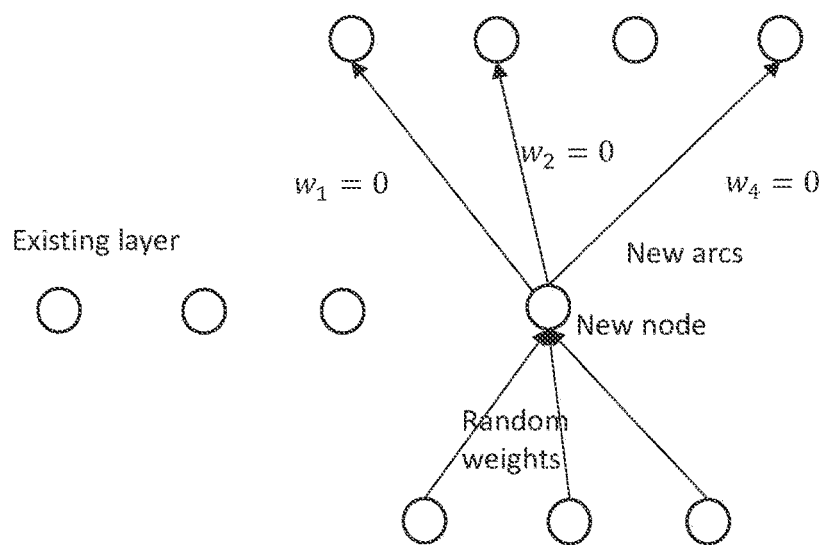

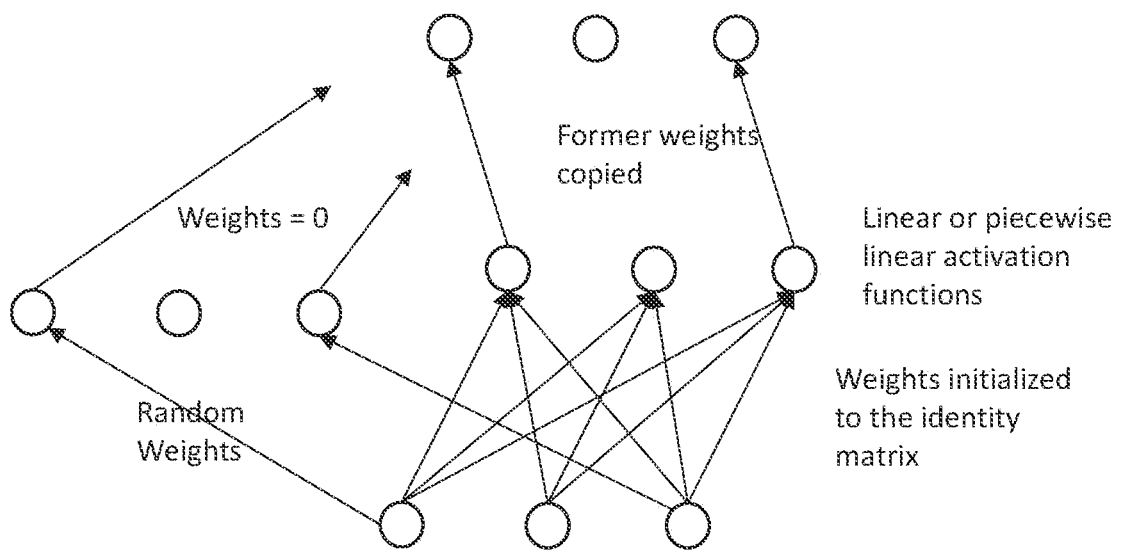
Figure 7: Adding a New Layer to a Deep Neural Network Without Degrading Performance Figure 8: Another Method for Adding an Additional Layer to a Deep Neural Network
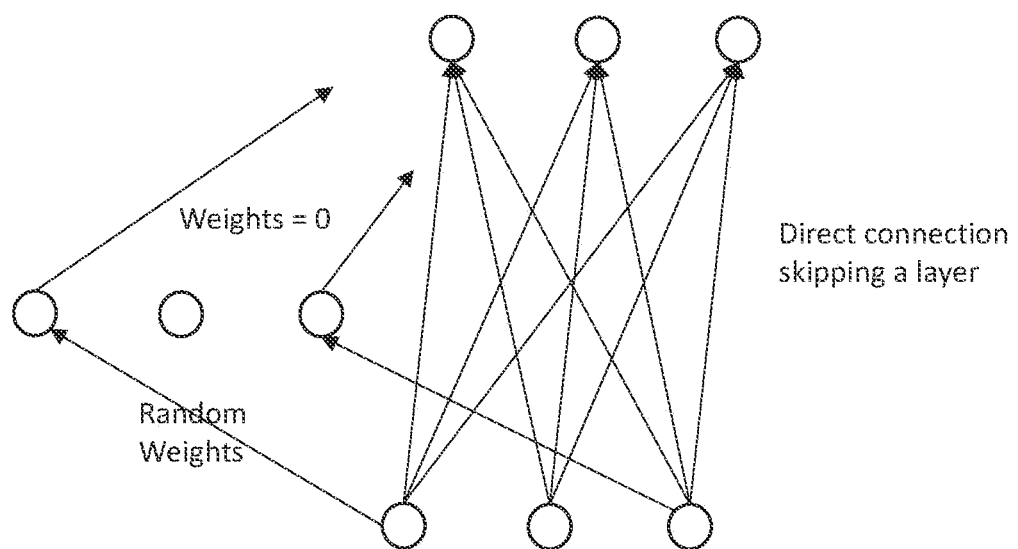

Figure 9: Example of a Compound Node
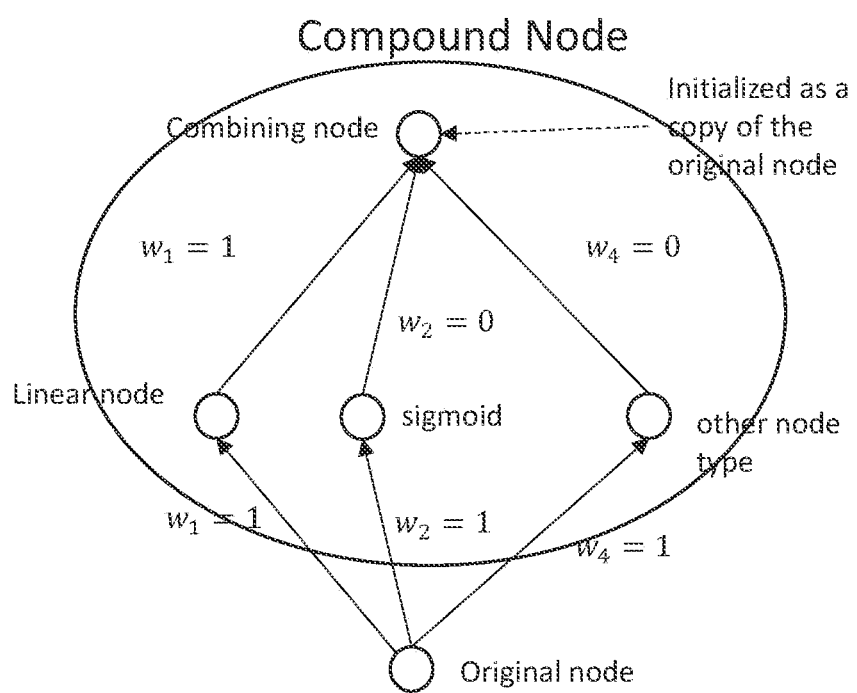

Figure 10: Adding an Input Node to an Existing Layer in a Deep Neural Network Without Degrading Performance
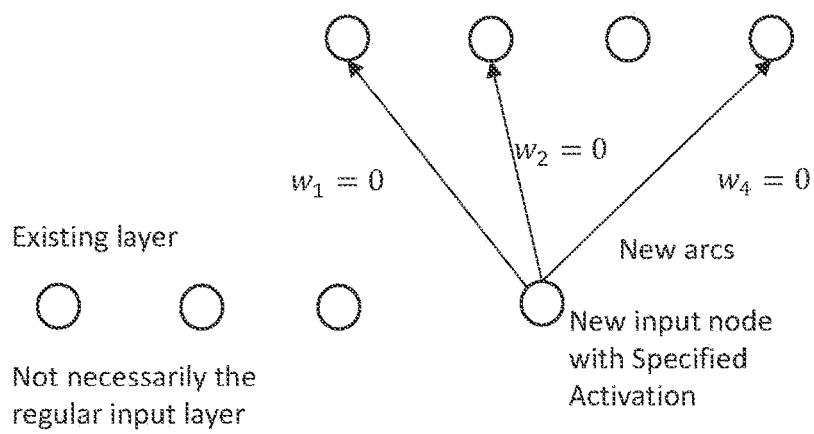

Figure 11: Adding a Output Node to an Existing Layer in a Deep Neural Network Without Degrading Performance
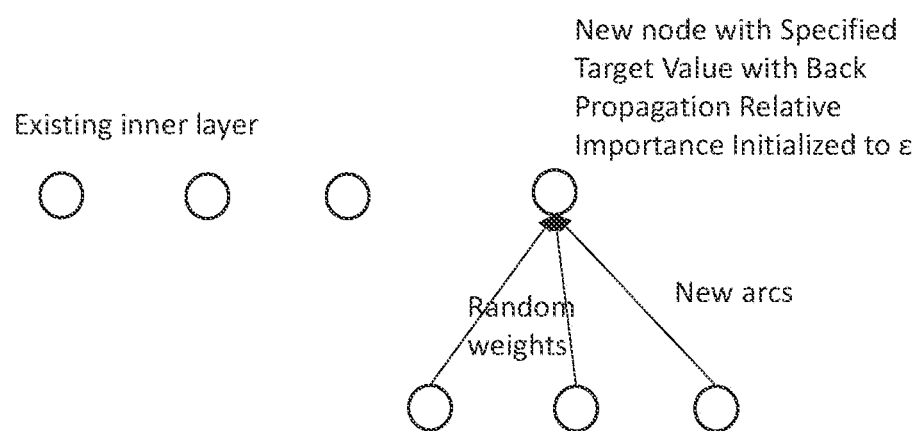

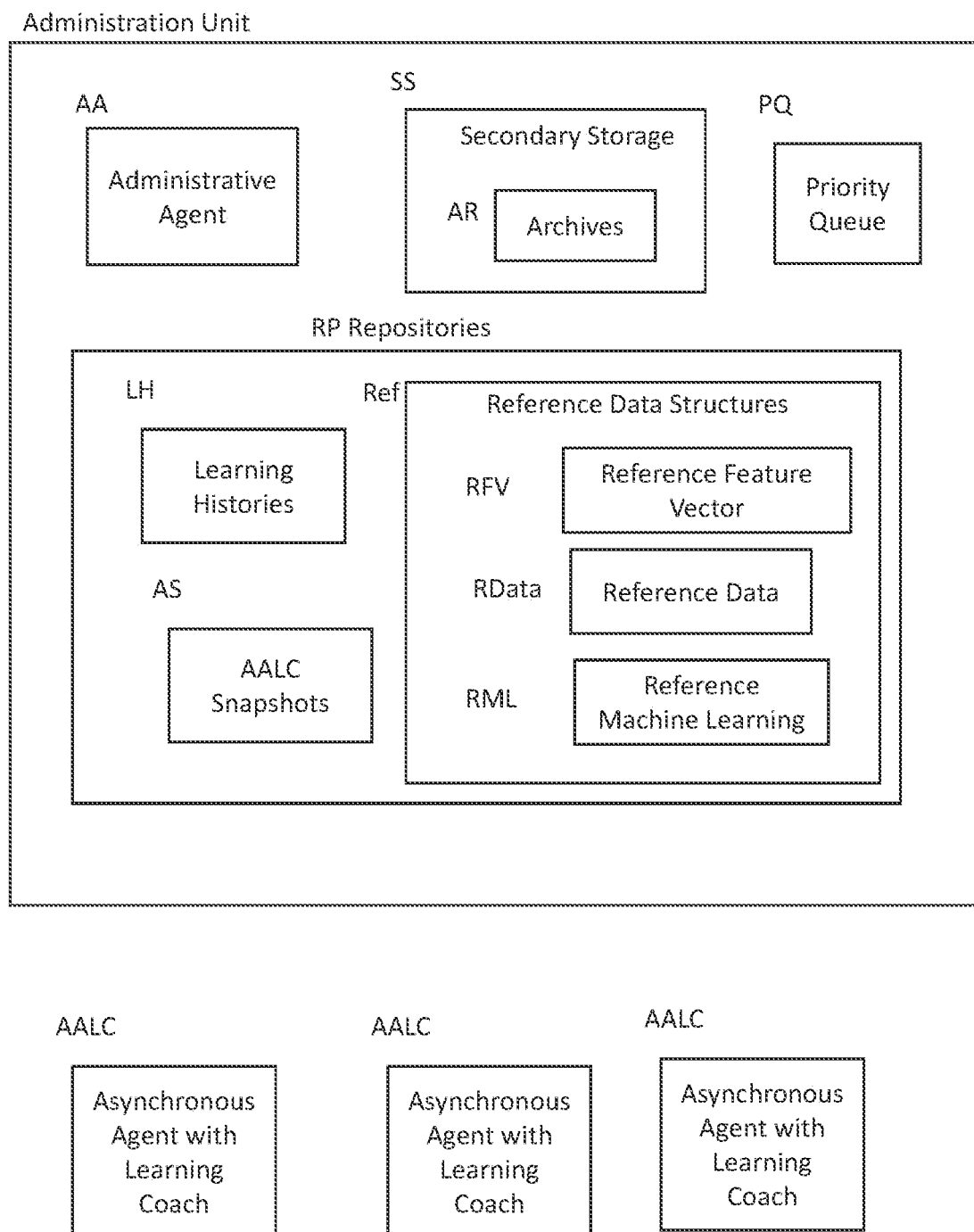
Figure 12: System with Multiple AALCs with Repository Detail

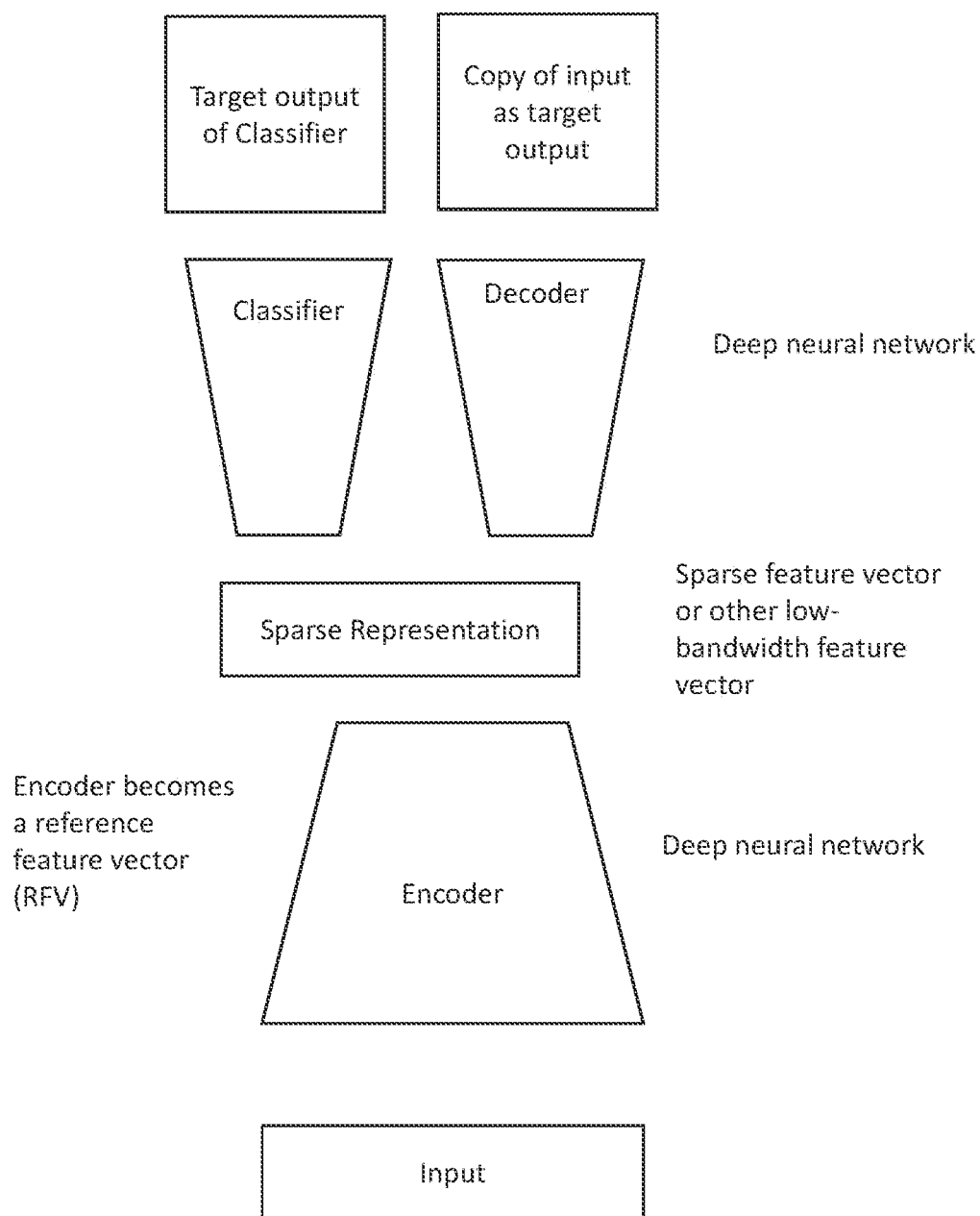
Figure 13: Supervised Training of Autoencoder with a Sparse Feature Vector

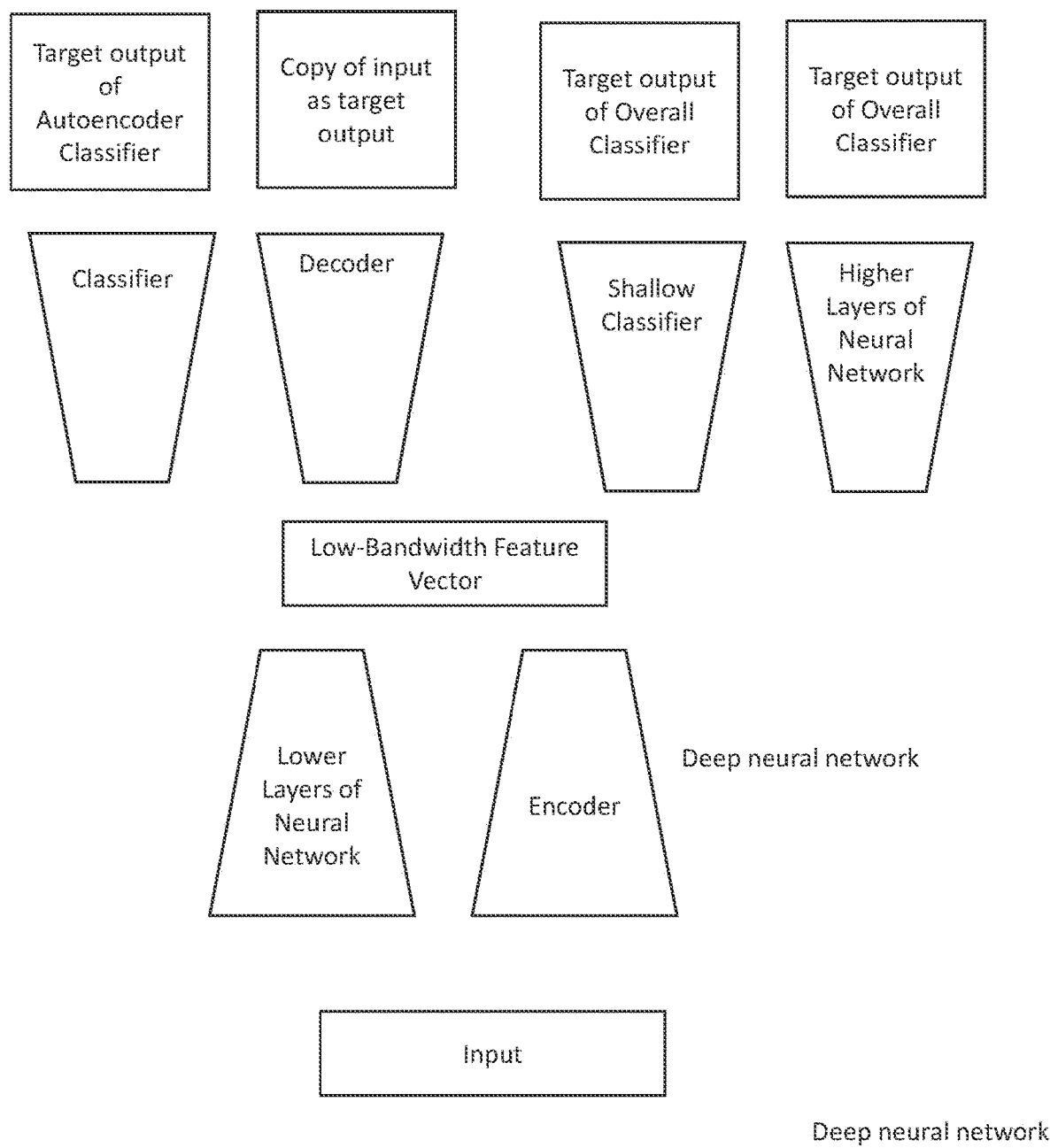
Figure 14: Stabilizing a Feature Vector Inserted into a Deep Neural Network

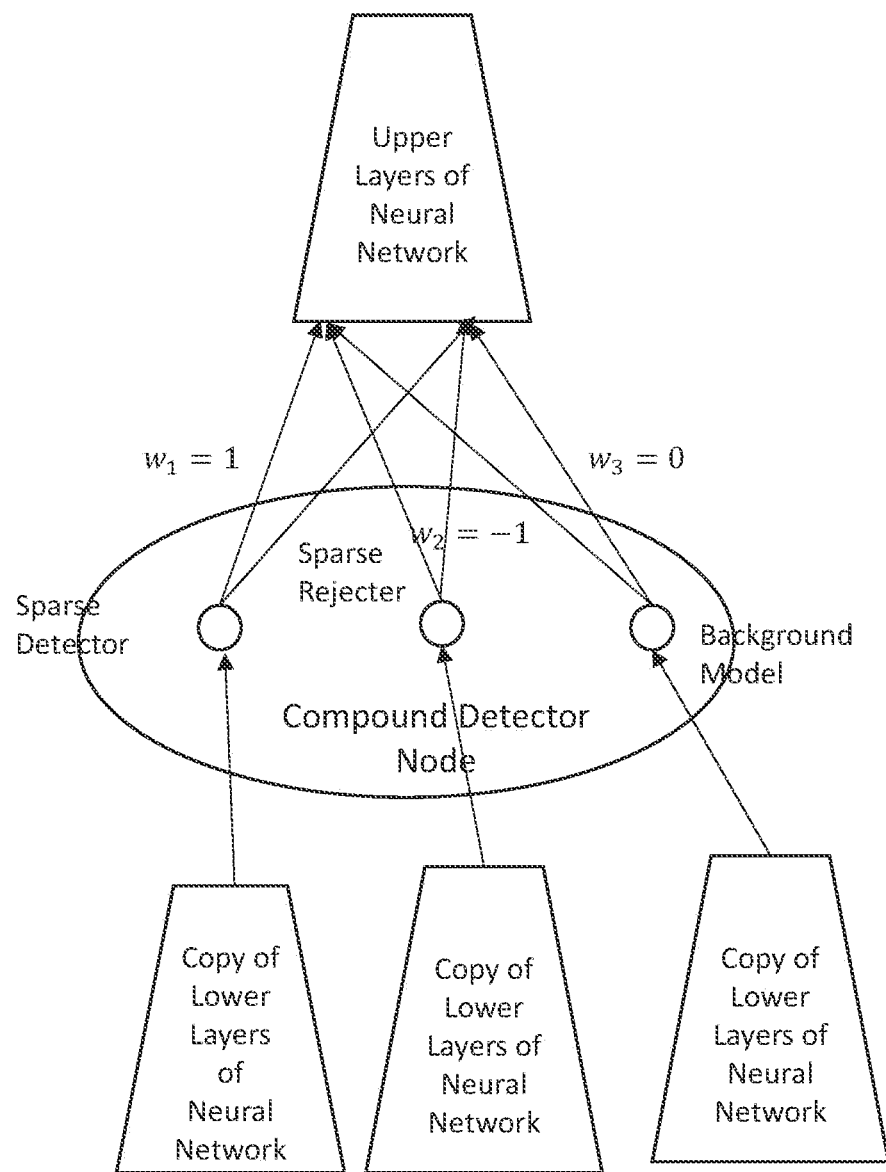
Figure 15: Compound Node as Detector and Rejecter

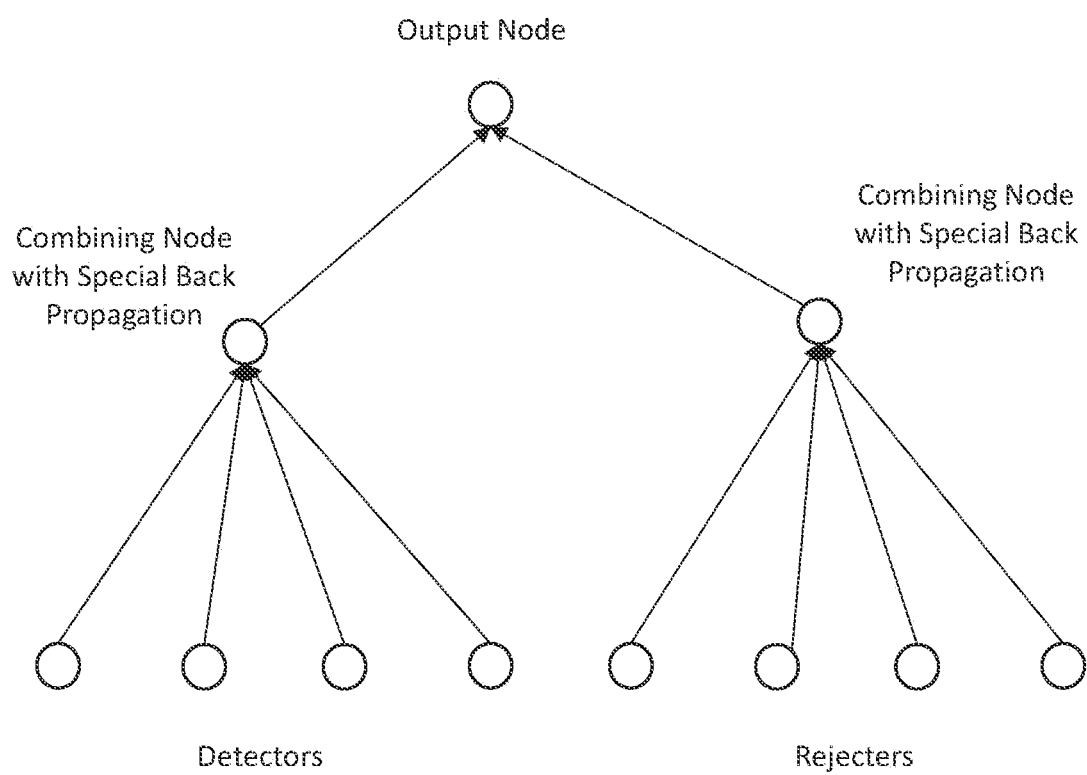
Figure 16: Output Node with Multiple Detectors and Rejecters

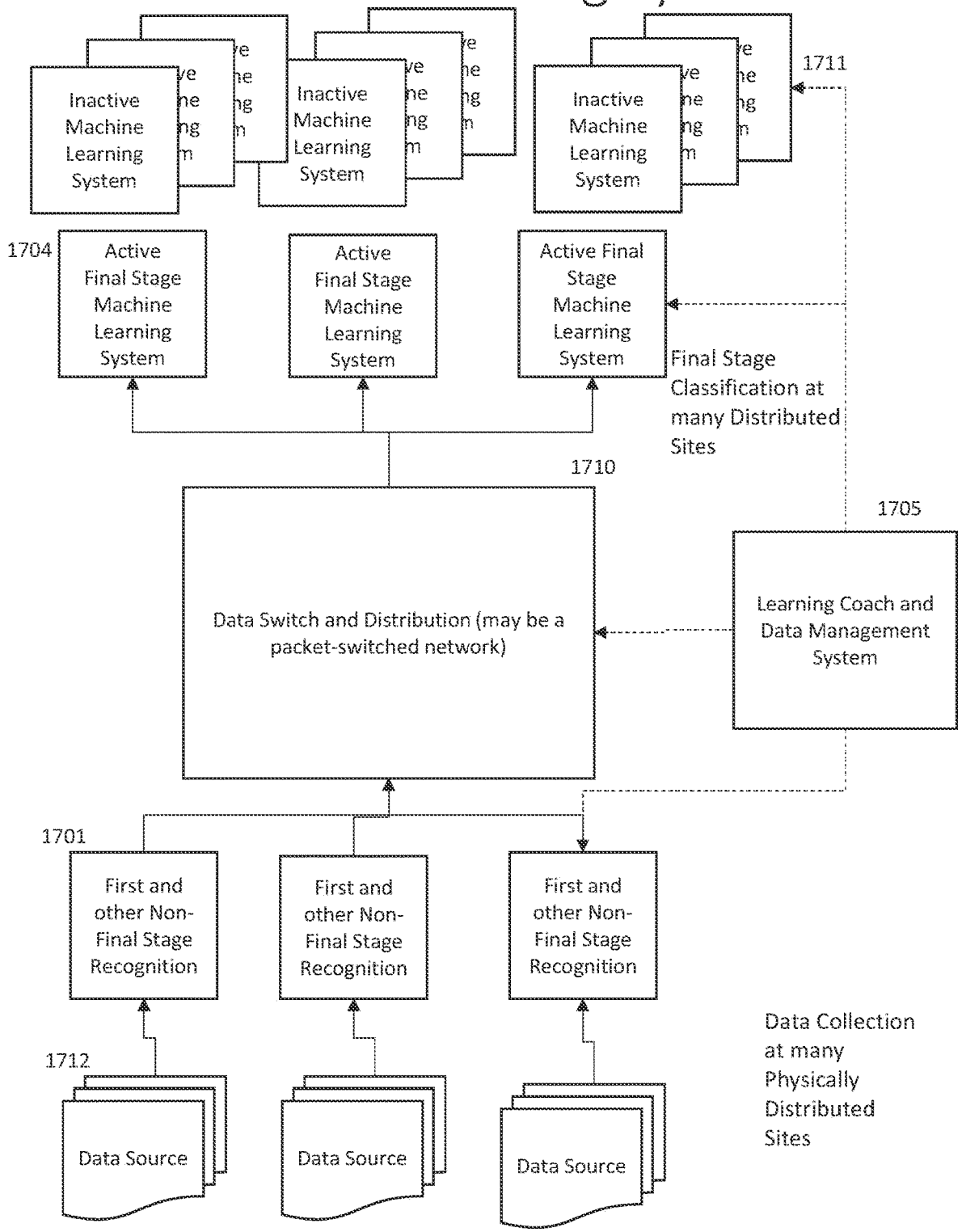
Figure 18: Staged Active/Inactive Machine Learning Systems

ASYNCHRONOUS AGENTS WITH LEARNING COACHES AND STRUCTURALLY MODIFYING DEEP NEURAL NETWORKS WITHOUT PERFORMANCE DEGRADATION

PRIORITY CLAIM

The present application is a continuation of U.S. nonprovisional application Ser. No. 17/653,006, filed Mar. 1, 2022, which is a continuation of U.S. nonprovisional application Ser. No. 16/618,910, filed Dec. 3, 2019, which is a national stage application under 35 U.S.C. § 371 of PCT application Serial No. PCT/US18/35275, filed May 31, 2018, which PCT application claims priority to U.S. provisional application Ser. No. 62/515,142, filed Jun. 5, 2017, entitled "Asynchronous Agents with Learning Coaches" and with the same inventor as noted above, and which is incorporated herein by reference in its entirety.

CROSS-REFERENCE TO RELATED APPLICATIONS

The present application is related to the following applications, all of which are incorporated herein in their entirety: PCT Application No. PCT/US17/52037, entitled "Learning Coach for Machine Learning System;" and PCT Application No. PCT/US18/20887, entitled "Learning Coach for Machine Learning System."

BACKGROUND

Machine learning systems, especially deep neural networks, have had remarkable success in recent years. In particular, they scale very well on problems with large amounts of data. In fact, they tend to satisfy the property that "bigger is always better." That is, the more data that is available for a given problem, the better the performance of a machine learning classifier or predictor. With deep neural networks, the larger the network and the more learned parameters, the better, up to a limitation that is imposed by the amount of data. As an example of the size of the data sets, ImageNet, an industry standard benchmark, has over 14 million images, over one million of which have been annotated and supplied with bounding boxes.

However, the large size of the data sets and the large number of parameters in machine learning systems such as deep neural networks also present problems. For example, the amount of computation required to train a deep neural network tends to grow proportional to the size of the data set times the size of the neural network. Also, large neural networks with many hidden layers are very difficult to interpret. It is also difficult to control the learning process in any detailed way.

Another problem that occurs with very large networks is that the computation needs to be spread among multiple computers. However, when the training of a network is spread among multiple computers that communicate with each other over a data channel with limited bandwidth, the data bandwidth can become the limiting factor in the speed of the computation. This data bottleneck can then limit the size of the largest practical network, even if more computers are used.

There are additional problems that eventually occur as the size of a deep neural network gets larger and larger, especially when adding extra layers to a network that is already trained to high performance. Although a deeper network in theory should always be able to perform better than a network with fewer layers, at least on training data, the opposite phenomenon has been observed. That is eventually, as more layers are added, the performance not only degrades, but degrades catastrophically. Some newer architectures have been able to significantly increase the number of layers before this problem occurs, but these newer architectures have not eliminated the problem.

Another problem that occurs with deep neural networks is that, with many layers, the gradient tends to "vanish," that is, the magnitude of the gradient tends to converge to zero. When the magnitude of the gradient gets close to zero, the learning in an algorithm based on gradient descent becomes very slow.

Another aspect in which "bigger is always better" is the use of ensembles of machine learning systems. For almost all benchmarks, ensembles of machine learning systems beat the performance of the best single systems. Furthermore, the performance tends to increase incrementally as more members are added to the ensemble. However, the amount of incremental improvement achieved by adding an additional member to an ensemble quickly declines. A significant problem is that the amount of computation with an ensemble tends to be proportional to the number of members in the ensemble, both in training and in operation. Thus, increasing the size of large ensembles is not cost effective.

SUMMARY

In one general aspect, the present invention is directed to methods and computer systems for improving a base deep neural network. The method comprises training the base deep neural network with training data to a desired performance criteria, such as to or near (within a threshold of) convergence or a stationary point. The base deep neural network comprises an input layer, an output layer, and a first hidden layer that is between the input and output layers. The first hidden layer comprises a first node that in turn comprises a first incoming arc and a first outgoing arc. The method further comprises structurally changing the base deep neural network to create an updated deep neural network, such that the updated deep neural network has no degradation in performance relative to the base deep neural network on the training data. The method further comprises subsequently training the updated deep neural network.

In various implementations, structurally changing the base network can comprises adding a new arc to the first node without degrading the performance of the updated neural network relative to the base neural network. The new arc could be an incoming arc to the new node or an outgoing arc from the new node. The structural change to the base network may also comprise adding a second node to the first hidden layer or adding a second hidden layer to the base neural network. Still further, structurally changing the base network may comprise replacing the first node in the hidden layer with a compound node that comprises, for example, a detector node and a rejecter node. In various implementations, the base neural network comprises an upper sub-neural network that comprises the output layer and a lower sub-neural network that comprises the input layer, such that the hidden layer is between the upper and lower sub-neural networks. In that case, structurally changing the base network may further comprise replicating the lower sub-neural network such that there are at least a first lower sub-neural network and a second lower sub-neural network, such that the detector node of the compound network the hidden layer is connected to the upper sub-neural network and the first lower sub-neural network and the rejecter node of the compound network the hidden layer is connected to the upper sub-neural network and the second lower sub-neural network. The compound node may further comprise a third node, in which case structurally changing the base network may further comprise replicating the lower sub-neural network such that there is a third lower sub-neural network and such that the third node of the compound network the hidden layer is connected to the upper sub-neural network and the third lower sub-neural network.

In another general aspect, the present invention is directed to an asynchronous agent for use in a machine learning system. The asynchronous agent comprises a second machine learning system ML2 that is to be trained to perform some machine learning task. The asynchronous agent further comprises a learning coach LC and an optional data selector machine learning system DS. The purpose of the data selection machine learning system DS is to make the second stage machine learning system ML2 more efficient in its learning (by selecting a set of training data that is smaller but sufficient) and/or more effective (by selecting a set of training data that is focused on an important task). The learning coach LC is a machine learning system that assists the learning of the DS and ML2. Because the asynchronous agent comprises one or more learning coaches LC, it is sometimes referred to herein as an asynchronous agent with a learning coach or "AALC."

The present application describes how the second stage machine learning system ML2 can be incrementally trained and grown with input from the learning coach LC and/or data selection machine learning system DS. One of the ways that the second stage machine learning system ML2 can grow, particularly when it comprises a deep neural network, is through the addition of new arcs between nodes, new nodes in existing layers of the network, new layers in the network, compound nodes, and/or new input or output nodes. Various techniques for growing a network in this manner, without degrading performance of the network, at least with respect to training data, are described herein.

In other general aspects, the present invention is directed to a system comprising multiple AALCs that are in communication via, for example, an administrative unit. Each AALC is trained and grown asynchronously under the guidance of their respective learning coaches to perform different tasks. In such a system, the AALCs may have been trained on different data and/or may have different network architectures. The present application describes manners for the AALCs to communicate about the internal states in efficient ways.

These and other benefits from embodiments of the present invention will be apparent from the description that follows.

FIGURES

Various embodiments of the present invention are described herein by way of example in conjunction with the following figures, wherein:

FIG. 1 is a block diagram of an AALC according to various embodiments of the present invention;

FIGS. 2 and 12 are block diagrams of system with multiple AALCs according to various embodiments of the present invention;

FIG. 3 is a flow chart of a process for incremental learning and growth of an AALC according to various embodiments of the present invention;

FIG. 4 is a diagram illustrating a technique for combining an ensemble into a single deep neural network according to various embodiments of the present invention;

FIG. 5 is a diagram illustrating a technique for adding an arc to a deep neural network without performance degradation of the network according to various embodiments of the present invention;

FIG. 6 is a diagram illustrating a technique for adding a node to an existing layer of a deep neural network without performance degradation of the network according to various embodiments of the present invention;

FIGS. 7 and 8 are diagram illustrating techniques for adding a new layer of nodes to an existing layer of a deep neural network without performance degradation of the network according to various embodiments of the present invention;

FIG. 9 is a diagram of a compound node;

FIG. 10 is a diagram illustrating a technique for adding an input node to an existing layer of a deep neural network without performance degradation of the network according to various embodiments of the present invention;

FIG. 11 is a diagram illustrating a technique for adding an output node to an existing layer of a deep neural network without performance degradation of the network according to various embodiments of the present invention;

FIG. 13 is a diagram illustrating a technique for supervised training of an autoencoder with a sparse feature vector according to various embodiments of the present invention;

FIG. 14 is a diagram illustrating a technique for stabilizing a feature vector inserted into a deep neural network according to various embodiments of the present invention;

FIG. 15 is a diagram illustrating a compound node functioning as a detector and rejecter according to various embodiments of the present invention;

FIG. 16 is a diagram of an output node with multiple detectors and rejecters according to various embodiments of the present invention; and FIGS. 17 and 18 are diagram s of multi-stage learning systems according to various embodiments of the present invention.

DETAILED DESCRIPTION

Figure 17:
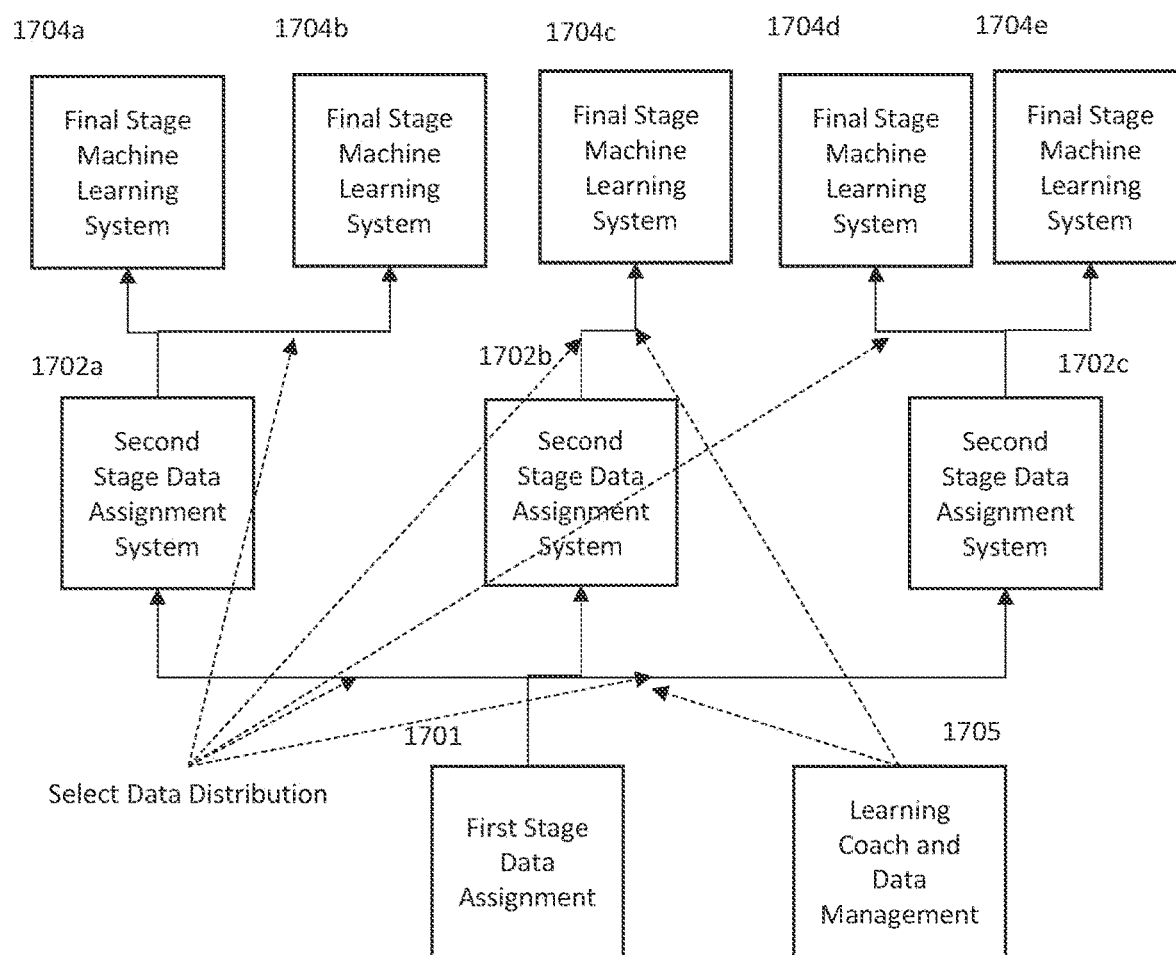

An illustrative embodiment of the present invention is a machine learning system that learns to approximate a mapping $y=f(x)$ from an input space $x \in X$ to an output space $y \in Y$, based on a set of labeled training examples $S=\{<x(m), y(m)>$, where $y(m)=f(x(m))$, $m=1, \ldots, M\}$, where M is the size of S. Input space X is called the "global" input space; Y is called the "global" output space; and set S is the total training set. Illustrative embodiments of the invention have one or more asynchronous agents, each with a learning coach. Each individual asynchronous agent with learning coach (AALC) may have an individual input space that is distinct from the global input space. In many embodiments, the task is a pattern recognition or classification problem. Then, the output space Y is a finite set of classification categories. Each individual AALC may have an individual output space that is distinct from Y. For example, it may be a set of disjoint subsets of Y, indicating a simplified classification problem in which some distinctions are ignored.

Description of Overall System (FIGS. 1 and 2): FIG. 1 shows an illustrative embodiment of an intelligent AALC. Embodiments of this invention are also directed to a network or system that comprises many such intelligent AALCs, as shown in FIG. 2. In the example shown in FIG. 1, the AALC comprises at least three disjoint subsets of the set S, namely a training set T, a second stage training set T2, and a validation set V. It may also comprise a fourth set D2, which can be a development set that will be discussed later. The intelligent AALC also comprises at least two primary machine learning systems: a data selector machine learning system DS and a second stage machine learning system ML2. The intelligent AALC also comprises at least one learning coach LC. The learning coach LC is a learning coach for both data selection machine learning system DS and machine learning system ML2. In some embodiments, there is a learning coach LC for data selection machine learning system DS, and a separate learning coach LC2 for machine learning system ML2. Some embodiments have a single learning coach LC, which does all the functions done by the two learning coaches LC and LC2. Without loss of generality, the illustrative embodiments will be described as if there is a single learning coach LC. The learning coach(es) LC may itself be a machine learning system that helps the data selection machine learning system DS and/or machine learning system ML2 learn their systems, as described further below. More details about such a learning coach are described in U.S. provisional patent application Ser. No. 62/476,280, filed Mar. 24, 2017, entitled "Learning Coach for Machine Learning System," by James K. Baker, which is incorporated herein by reference in its entirety (hereinafter, "the Learning Coach Provisional Application").

The AALC also comprises a classification task specification TS. The task specification TS specifies the target categories for the machine learning systems DS and ML2. In some illustrative embodiments of this invention, the categories specified by TS are elements or subsets of the global output space Y. Illustrative embodiments of AALCs implement an incremental learning strategy in which smaller, easier classification tasks are learned first, and then harder tasks are learned, building on knowledge learned in the easier tasks. In this progression, the elements of the AALCs grow in several ways: the size and complexity of the machine learning systems DS and ML2 grows; the amount of data in the training and validation datasets grows; and the complexity of the task specification grows. That is, tasks with more categories and finer distinctions are specified.

The AALC also comprises an input feature vector specification IFV. Generally, the global input space X for the classification or regression problem is a space of n-tuples of numerical or categorical values of the form $<f_1, f_2, \ldots, f_n>$. Each position in the n-tuple is called a "feature" and the n-tuple is called a "feature vector." However, the name "feature vector" only implies that the space X contains n-tuples. It is not necessarily possible to add two feature vectors together to get a third feature vector as in a formal vector space. An individual AALC may have as its input space a subspace of the global input space X. That is, an individual AALC may have as its input space a space of m-tuples $<g_1, g_2, \ldots, g_m>$, where each $g_j$ is equal to one of the $f_i$. In some embodiments, the $g_j$ may be derived features. That is, they may be functions of one or more of the global features $f_i$, or they may be the output values computed by another machine learning system. The input feature vector specification IFV for a particular AALC specifies for each feature of the input feature vector of the particular AALC how that input feature is computed from the global input feature vector.

FIG. 1 also shows that the AALC may further comprise an intelligent agent IA. Intelligent agent IA is also a machine learning system that controls the interactions with other AALCs (see FIG. 2) and selects policies to guide the learning strategies of the learning coaches LC. Intelligent agent IA can be trained by reinforcement learning and/or from prior experience. In some embodiments, the learning coach LC and the intelligent agent IA may be combined into a single machine learning system.

FIG. 1 shows a single AALC according to various embodiments of the present invention. Generally, there will be many AALCs in communication with each other as part of a network or system of AALCs, as shown in FIG. 2. Any AALC can spawn additional AALCs, so even when the learning process starts with a single AALC, the system can grow to have multiple AALCs.

The example AALC shown in FIG. 1 can be can be implemented with computer hardware and software. For example, the AALC could be part of an integrated computer system (e.g., a server or network of servers) that has multiple processing CPU cores. One set of cores could execute the program instructions for the intelligent agent IA, the learning coach(es) LC, the data selection machine learning system DS and the 2nd stage learning system ML2. The program instructions could be stored in computer memory that is accessible by the processing cores, such as RAM, ROM, processor registers or processor cache, for example. In other embodiments, some or all of the intelligent agent IA, the learning coach(es) LC, the data selection machine learning system DS and the 2nd stage learning system ML2 could execute on graphical processing unit (GPU) cores, e.g. a general-purpose GPU (GPGPU) pipeline, and/or on one or more AI accelerators. GPU cores operate in parallel and, hence, can typically process data more efficiently that a collection of CPU cores, but all the cores execute the same code at one time. Thus, if the intelligent agent IA, the learning coach(es) LC, the data selection machine learning system DS or the 2nd stage learning system ML2 were implemented with a GPGPU pipeline, the GPU cores would need to take turns executing the code for each system. An AI accelerator is a class of microprocessor designed to accelerate artificial neural networks and contains many processing elements (e.g., 50,000 processing elements or more) that use relatively low-precision arithmetic (e.g., 8-bits).

In other embodiments, some or all of the intelligent agent IA, the learning coach(es) LC, the data selection machine learning system DS and the 2nd stage learning system ML2 could be part of a distributed computer system. For example, the computer devices (e.g., servers) that implement the intelligent agent IA, the learning coach(es) LC, the data selection machine learning system DS and/or the 2nd stage learning system ML2 may be remote from each other and interconnected by data networks, such as a LAN, WAN, the Internet, etc., using suitable wired and/or wireless data communication links. Data may be shared between the various systems using suitable data links, such as data buses (preferably high-speed data buses) or network links (e.g., Ethernet).

The task specification TS and input feature vector specification IFV can be stored in files that are stored in primary and/or secondary computer memory of the AALC, for example. Primary computer memory can be RAM and ROM, whereas secondary computer memory can be storage devices that are not directly addressable by the processor(s), such as HDDs or flash memory, for example.

In addition to the multiple AALCs, the network or system of AALCs may include an administrative unit comprising an administrative agent AA, a priority queue PQ, a set of repositories RP, an archive AR, and secondary storage SS, as shown in FIG. 2. The administrative agent is a machine learning system that manages communication with the AALCs, and the resources in the administrative unit. The administrative unit may be implemented with one or more networked computer systems and is not necessarily a single central unit. The administrative agent may use multiple CPU or GPU cores, with the program instructions for the administrative agent being stored in computer memory that is accessible by the processing cores, such as RAM, ROM, processor registers or processor cache, for example. The resources may be implemented on a distributed system and/or there may be a multiplicity of administrative units. The functionality is the same, so without loss of generality, the discussions of illustrative embodiments will be in terms of a single administrative unit.

The priority queue PQ contains a prioritized list of the AALCs in the system and may be stored in a file that is stored in primary and/or secondary memory of the administrative agent. Mechanisms for determining the prioritized list are described below. The repositories contain copies of active and inactive AALCs in the system and of other resources used by and shared among the AALCs. For example, the repositories can store the data about the layers, nodes, weights and learning histories of the active and inactive AALCs in a database in a nonvolatile, primary and/or secondary memory (e.g., ROM or HDD) of the administrative agent. These copies of the AALCs preferably contain sufficient information to resume the learning process of the AALC from the state at which the copy was made. The archive contains permanent records of AALCs at various stages in their learning process and resources that they use. Generally, the archive AR is stored in secondary storage (e.g., HDDs or a disk array). Parts of the priority queue PQ and the repositories may also be stored in secondary storage, as describe above.

Illustrative Example: Personal Shopper. Many websites presently use machine learning to make customized recommendations to shoppers who shop on-line. An enhanced version of this capability is a natural application for a distributed learning system such as some embodiments of the present invention. Instead of the personal recommendation rules being under the control of the vendor, a personal shopper based on AALCs could gather information from multiple vendors while also personalizing recommendations under the control of each shopper.

Illustrative roles of DS, ML2, LC, IA, and AA. Each of the DS, ML2, LC, IA, and AA systems comprises one or more machine learning systems. In some embodiments, any of them can learn to do the tasks done by another of them in a different illustrative embodiment. The embodiments described are for purpose of illustration, and not restrictive. Other embodiments that merge two or more of these components or that assign their roles in a different fashion are equivalent for the purposes of this invention.

These intelligent subsystems can cooperate in the overall learning task. For the purpose of discussion, they have overlapping but distinctive roles as follows. The data selection machine learning system DS and the second stage machine learning system ML2 are primary pattern recognition systems, also called classification systems. They learn to map vectors of input values to scores for each of a set of target categories. That is, they each attempt to do within the scope of their resources the same task that the overall system is doing, or perhaps a scaled down version of the task based a subset of the input features and/or a reduced set of target categories. Preferably, none of the other machine learning systems LC, IA, or AA, do this pattern recognition task.

Machine Learning Systems DS and ML2: Data selection machine learning system DS preferably pre-selects the training data for the second stage machine learning system ML2 and is optional for the AALC. The purpose of data selection machine learning system DS is to make second stage machine learning system ML2 more efficient in its learning (by selecting a set of training data that is smaller but sufficient) and/or more effective (by selecting a set of training data that is focused on an important task). Without loss of generality, most of the descriptions of illustrative embodiments of the AALCs herein describe the AALCs as having a data selection machine learning system DS. However, it is to be understood that the scope the invention includes the same system without a data selection machine learning system DS. For example, a data selection system DS that always selects all of T2, so that T2'=T2, is a permissible data selection system (where T2' indicates the portion of T2 selected by DS). Some or all of the AALCs may not have a DS component but instead may have ML2 train on all of the training data T2 supplied to the AALC in its current round. Also, in some embodiments, the machine learning system DS and/or the machine learning system ML2 may comprise an ensemble of machine learning systems Learning Coach LC: Both data selection machine learning system DS and second stage machine learning system ML2 are primary machine learning systems. They each have a set of learned parameters that they adjust to minimize an objective function that represents the cost of errors in the classification process. The learning coach LC, on the other hand, preferably does not attempt to perform this classification itself. Its role is to guide and control systems DS and ML2 to help them learn faster and/or to help them learn parameter values that yield a lower cost of errors. Among other things, the learning coach LC can set the values of control parameters that control the learning process of DS or ML2 and/or that appear in the equations that describe the computations in the learning process of DS or ML2. To distinguish the parameters set by LC from the parameters learned by DA or ML2, the control parameters set by LC are called "hyperparameters." More details about hyperparameters are described in the Learning Coach Provisional Application. The learning coach LC can learn from prior experience with other learning tasks as well as from experiments during the current learning task.

Illustrative example: Training a Deep Neural Network with a Learning Coach: The following pseudo-code illustrates training a deep neural network using stochastic gradient descent with updates done in minibatches. The hyperparameters are controlled and customized by the learning coach LC, and there are several other innovations. In this illustrative example, the output node activation is a softmax with temperature as a hyperparameter. Each interior node is a sigmoid with a temperature hyperparameter $\sigma(x; T)=1/(1+\exp(-x/T))$. There is gradient normalization by layer.

Pseudocode of stochastic gradient descent with gradient normalization and learning coach control
1. For each epoch until stopping criterion is met
   a. $a_{l-1,0}(m) = 1$, is constant, so $w_{l,0,j}$ is a bias for node j in layer 1
   b. Input a set (minibatch number t) of training examples
     1. For each training example m, set $a_{0,i}(m)$ and perform the following steps:
       1. Feedforward (softmax output): For each $l = 1, 2, \ldots, L - 1$ compute $z_{l,j}(m) = \Sigma_{i=0}^{n_l} w_{l-1,i,j} a_{l-1,i}(m)$, $a_{l,j}(m) = \sigma(z_{l,j}(m); T_{l,j,t})$;
       2. Softmax output: $a_{L,k} = e^{z_k/T_{L,k,t}}/(\Sigma_j e^{z_j/T_{L,j,t}})$; $s_{L,n} = 1$;
       3. Output error gradient (m):

1. $\delta_{L,j}(m) = -\dfrac{y_j(m) - a_{L,j}(m)}{n_L T_{L,j,t}}$

4. Backpropagate error gradient: For each l = L-1, L-2, . . . , 2, 1 compute $\delta_{l-1,i}(m) = \left(a_{l-1,i}(m)(1 - a_{l-1,i}(m))\sum_{j=1}^{n_l} w_{l,i,j}\delta_{l,j}(m)\right) / (s_{l-1}T_{l-1,i,t})$ 2. Compute gradient for minibatch:
$\Delta_{l-1,i} = \Sigma_{m=1}^{M} a_{l-1,i}(m)\delta_{l,j}(m)/M$
3. Compute momentum:
$v_{l,i,j} \rightarrow v_{l,i,j} = \mu_{l,i,j}v_{l,i,j} - \eta_{l,i,j}\Delta_{l-1,i}$
4. Compute norm for layer:
$s_l = \text{Max}_i|\Delta_{l,i}|$
5. Gradient descent: For each l = L-1, L-2, . . . , 2, 1 update the weights
$w_{l,i,j} \rightarrow w_{l,i,j} = w_{l,i,j}(1 - \lambda_{l,i,j}) - v_{l,i,j}$ There are several innovations over the prior art illustrated in this pseudo-code. First, the hyperparameters are controlled by the learning code LC. For many of the hyperparameters, there can be a customized value for each learned parameter. That is, the hyperparameters $\eta_{l,i,j}$, $\lambda_{l,i,j}$, and $\mu_{l,i,j}$ can all have value that are different for each arc weight. In addition, there is a hyperparameter, temperature that can be different for each node. This temperature can be used by the learning coach, for example, to eliminate vanishing gradients due to saturation of the sigmoid activation function. It can be adjusted for each node to prevent saturation of that node. Another innovation is gradient normalization. The layer-by-layer scale factor $s_l$ prevents the phenomenon of vanishing or exploding gradients caused by back propagating the partial derivatives through many layers of a very deep neural network.

Another aspect of the learning coach LC is that it can change the structure or architecture of machine learning systems DS and ML2. Such changes may affect the amount of computation done by DS or ML2. Learning coach LC may have an objective function that is distinct from the objective functions of DS and ML2. For example, the learning coach's objective function may include a component that reflects the cost of computation required by DS or ML2, as a function of changes in their architecture.

Although the pseudo-code above is specific to the illustrative example of training a deep neural network, embodiments of many machine learning algorithms have hyperparameters to control the training process. In any of these embodiments, learning coach LC can customize the hyperparameters in a way similar to this pseudo-code. Learning coach LC is itself a machine learning system. As a machine learning system, it can be initialized to implement whatever hyperparameter values and value-change rules would be done without the learning coach. Then, from prior experience coaching other primary machine learning systems, learning coach LC can learn to recognize patterns in the variables that can be observed in the learning process, and from those patterns learning coach LC can learn when it can make changes or customization to the hyperparameters to get even better learning performance. The collection of mappings from patterns to actions by learning coach LC is called a learning "strategy."

Learning coach LC may have a collection of strategies. For example, it may have strategies that are more aggressive to help machine learning systems DS and ML2 learn faster at the risk that the learning process made lead them to a state that has poorer performance. It may have other strategies that are more conservative, with less risk but slower learning. Learning coach LC may also have strategies that differ in the propensity to make changes in the structure of DS or ML2, or that make different kinds of changes. The strategies can be selected by the intelligent agent IA as described below.

Intelligent Agent IA: One of the roles of an intelligent agent IA is to set a policy the selects the strategies used by learning coach LC. In an illustrative embodiment, an intelligent agent IA learns by reinforcement learning. In asynchronous action-critic reinforcement learning, for example, an intelligent agent IAs learns a value function that estimates the discounted future value of being in a particular state, and a policy function that determines a probability distribution for transition to the next state. The relative rank of an AALC in the priority queue PQ can be determined in part by this estimated discounted future value. In an illustrative embodiment of this invention, the state transition includes changes made to system DS or ML2 or to their hyperparameters, and the policy includes the policy that intelligent agent IA uses to guide the strategy of learning coach LC.

The intelligent agents IA also have the role of communicating with each other, exchanging knowledge and information. For example, as discussed later, regularization within system DS and system ML2 includes regularization of latent variables and learned parameters across multiple AALCs. As another example, communication among AALCs may include an element or subsystem being copied from one machine learning system DS or ML2 and being inserted into a machine learning system in another AALC. An intelligent agent IA can also manage these communications, as well as the transfer of data to and from the repositories.

Administrative Agent AA: In various embodiments, the administrative agent AA controls the priority queue PQ, which controls which AALCs are active. The administrative agent can also control the selection of data to be transferred into and out of the repositories and the data to be transferred to the archive. It also may be trained by reinforcement learning. In some embodiments, however, administrative agent AA may have a fixed set of policies and may only need to recognize situations in which to take pre-defined actions.

The priority queue PQ can comprise a prioritized list of AALCs that are active or that might be made active. The priority is determined by the AA's policy. For example, a policy may give priority to AALCs that contain smaller second stage machine learning systems ML2, and to intelligent agent policies to cause these smaller systems to grow. As a different example, a policy might give priority to AALCs with small ML2s, but with IA policies that cause the AALC to tend to spawn and create additional AALCs with small ML2s, with the objective that these ML2s or their AALCs will later be combined into an ensemble. As another example, a policy might give priority to AALCs containing deep neural networks with many layers and with IA policies that grow extra layers to make them even deeper. Among AALCs for which the administrative agent does not specify an overriding priority difference, the relative priority is determined by the discounted future value estimates by the AALC's intelligent agent. In some embodiments, the administrative agent AA may specify no overriding priority, leaving the priority to be determined by the estimated discounted future value. The administrative agent AA can also control the number of active AALCs, based on the available computational resources.

Incremental Learning and Growth: An illustrative embodiment of this invention starts with small, easy to train neural networks doing simple classification tasks and incrementally growing the networks to larger networks and ensembles doing more difficult classification tasks. As shown in FIG. 2, the system may contain many AALCs. However, the incremental learning and growth process may start with a single AALC. Furthermore, because the AALCs operate asynchronously, as their name implies, most of the descriptions of illustrative embodiments will be from the point of view of a single AALC, controlling its internal components and interacting with other AALCs.

In various embodiments of another aspect of the invention, the methods of incremental learning and growth described in association with FIG. 3 and other figures are applied to building and training a single neural network or other machine learning system or a single ensemble of machine learning systems. In such embodiments, the incremental learning and growth process illustrated in FIG. 3 may be controlled directly or by a learning coach. Optionally, an agent may also be used, but there is no need for multiple asynchronous agents.

In the illustrative embodiment shown in FIG. 1, the task is classification; Y is a finite set, and the AALC also has a set of target categories TC={$C_1$, $C_2$, ... $C_N$}. In many embodiments, each target category is a subset of Y. In some embodiments, the target categories are all disjoint subsets. In some embodiments, each of the subsets $C_1$, $C_2$, ... $C_{N-1}$ contains a single element and $C_N$ contains the rest of the elements of Y, a so-called "catch-all" category.

The exemplary process of training an AALC according to various embodiments of the present invention is illustrated in FIG. 3. The process starts by selecting the architectures and initializing the parameters for the machine learning system DS and ML2 (Block 301). Then the training datasets T and T2 and validation set V are selected (Block 302). Development set D2 will be discussed later.

Next a classification task is specified. For example, the input feature vector and the set of output classification categories can be specified (Block 303). In this illustrative embodiment, the machine learning systems DS and ML, the datasets T, T2, and V, and even the selection of target classification categories and the number of features in the input feature vector change and grow as the AALC progresses from easier to harder problems. The selection at block 303 can also include a selection of an initial set of classification categories and an input feature vector. Some of these categories may be subsets of the set of elementary categories Y. That means that the machine learning systems for that task do not need to distinguish among the elementary categories, but only to recognize that the item being classified is a member of the set.

As an illustrative example of the training of an AALC, consider an image classification task. For example, ImageNet is a testbed benchmark with millions of images with over a million of them annotated with captions. In this illustrative example, let AALC be initialized to distinguish images of cats from images of dogs. That is, let TC={{"cat"}, {"dog"}, $C_N$=Y−{"cat"}−{"dog"}}. Let the T be a randomly chosen subset of Y containing, say, 50 images of cats, 50 images of dogs, and 50 other images. Let T2, and V be randomly chosen subsets of S that are disjoint from each other and from T.

As another illustrative example, let the task be medical diagnosis. In this example, the initial categories could be presence or absence of a particular disease, for example diabetes: TC={{"has diabetes"}, {"does not have diabetes"}}.

Once the machine learning systems, the datasets, and the classification task have been specified, the process begins an iterative training and growth cycle that starts with Block 304.

Iterative Learning and Growth Cycle: The training of an AALC in this illustrative example begins with supervised training of DS using the training data T (Block 304). Any of the many well-known methods for supervised training of a machine learning system may be used. For example, DS may be a deep neural network trained using stochastic gradient descent with partial derivatives estimated by back propagation with updates done in minibatches. The hyperparameters may be controlled by the learning coach LC and there may be customized hyperparameters for each weight in the neural network, as illustrated by the exemplary pseudocode shown above. If second stage machine learning system ML2 is also a deep neural network, then the pseudo-code is an illustrative embodiment for both Block 304 and Block 307. Other types of machine learning systems have similar supervised training algorithms that are well-known to those skilled in the art of machine learning and which can be used to train the DS and/or ML2

Data Selection by DS: Continuing the illustrative example of image recognition, first data selection machine learning system DS is trained to distinguish "cat" from "dog" using the training set T (Block 303). Then, data selection machine learning system DS is used to classify second stage training set T2 (Block 305). Based on the classification results of DS on the set T2, a subset T2' of T2 is selected. For example, under controls set by learning coach LC, DS may select all errors or close calls (Block 306). That is, any instance in which DS misclassifies and image of a "cat" or a "dog" or any other image that DS incorrectly classifies as a "cat" or a "dog" would be selected to be in T2'. In addition, any instances that are close to causing an error would also be selected to be in T2'. In many embodiments, machine learning system DS may be much smaller and use less computation than machine learning system ML2. It is quite acceptable and, in some embodiments even desirable, for machine learning system DS to have a higher error rate than ML2.

The criterion for selecting an instance as a close call preferably is controlled by the learning coach LC. For example, the learning coach LC could set a hyperparameter ε such that, if the score of some incorrect answer is greater than the score of the correct answer minus ε, then that instance is selected. The learning coach LC would learn the proper value for ε, or any other criterion for selecting close calls by training based on prior experience in coaching other systems.

Training ML2: Once the data set T2' has been selected, second stage machine learning system ML2 is trained on T2' according to various embodiments of the present invention. Optionally, at set times or at times under the control of learning coach LC, machine learning system ML2 may be tested on all of data set T2. Then errors and close calls made by ML2 may be added to T2'. In general, set T2' is much smaller than T2, so the training time is greatly reduced.

Growing the Task, the Data Sets, and the Machine Learning Systems: Once machine learning system ML2 has been trained on training dataset T2', some of the elements of AALC are incrementally grown (Blocks 308, 309, 310, and 312), depending on the strategies and policies of the intelligent agent IA, according to various embodiments of the present invention.

Block 308 optionally grows or replaces data selection machine learning system DS. In an illustrative embodiment, DS is grown or replaced by a larger machine learning system, for example a larger decision tree or a larger neural network, with the intention of the larger machine learning system being more accurate and more selective in the task of selecting errors and close calls on the current classification task. In one illustrative embodiment, DS is replaced by machine learning system ML2, or a combination of DS and ML2. This illustrative embodiment gains efficiency in the training process because ML2 is a larger machine learning system that has already been trained. In another illustrative embodiment, data selection machine learning system DS is replaced by a machine learning system from one of the other AALCs, or from the repository RP. In another illustrative embodiment, data selection system DS is an ensemble and is grown by adding one or more additional components to the ensemble. In choosing the replacement for DS among several already trained machine learning systems, in some embodiments, learning coach LC can test their performance on the held-out development set D2.

In some illustrative embodiments, the number of the categories in the classification task is increased in block 309. In these embodiments, data selection machine learning system DS is retrained even if there has been no change in the architecture of DS.

Block 309 optionally grows the number of categories in the classification task. For example, it may remove one or more single elements from the catch-all category or some other category with multiple elements. In the illustrative image recognition task, for example, it could add additional types of animals, such as {"elephant"} and {"giraffe"}. In the medical diagnosis example, additional diseases could be added. As another example, it may split one or more of the multi-element categories into two or more subsets. For example, it could split {"cat"} into {"house cat"} and {"wild cat"}. In the medical diagnosis example, Type1 and Type2 diabetes could be distinguished.

Block 310 grows second stage machine learning system ML2. The growth of machine learning system ML2 is optional if at least one of the other system components has been changed. In an illustrative embodiment, ML2 is grown or replaced by a larger machine learning system, for example a larger decision tree or a larger neural network with the intention of the larger machine learning system being more accurate. In another illustrative embodiment, second stage machine learning system ML2 is replaced by a machine learning system from one of the other AALCs, or from the repository RP. In another illustrative embodiment, machine learning system ML2 is an ensemble and is grown by adding one or more additional components to the ensemble. In some illustrative embodiments, the number of the categories in the classification task is increased in block 309. In these embodiments, second stage machine learning system ML2 is retrained even if there has been no change in the architecture of ML2.

Block 311 optionally changes the set of input features. Being able to select a subset of the input features initially saves computation and enhances the ability of the system to create diversity among its asynchronous agents with learning coaches AALCs. Being able to reduce the input feature set in special situations also contributes to these properties. On the other hand, being able to increase the set of input features later is essential to being able to build a machine learning system ML2 that can encompass the full classification task on the full feature space.

The method of selective growth of the set of training data (block 304 to block 308) may be used by itself, without using any of the other growth methods (block 309 to 311). Similarly, any one of the growth methods (1) growing the number of output categories (block 309), (2) growing the size or complexity of the machine learning system (block 310), or (3) growing the number of input features (block 311) may be used in an iterative growth procedure in which the new machine learning system is initialized to perform the same as the system before the growth step and is subsequently trained to improve the previous performance. Any of these four growth methods may be used in any of the AALCs, in a stand-alone system, or in one or more members of an ensemble.

Illustrative Example: Frequency Bands in Speech Recognition: In speech, much information is available from the audio signal limited to a particular frequency range. For example, most of the information distinguishing one vowel from another is available from frequencies below 3000 Hz. On the other hand, most of the energy of an /s/ is above 4000 Hz. Dividing the frequency range into several bands to be analyzed by different AALCs reduces the amount of computation and creates substantial diversity among the AALCs. On the other hand, state-of-the-art performance in speech recognition requires that some of the machine learning systems ML2s look at the whole picture, the full frequency range.

Returning to FIG. 3, Block 312 optionally changes the training datasets T and T2 and/or the validation set V. The development set D2 is used for development in some embodiments that will be discussed later. It is not necessarily changed in Block 312, but may be changed at appropriate times depending on it usage. In some embodiments, Block 312 adds to each of the sets T, T2 and V, or replaces them with larger sets. In some these embodiments, the strategy is to first train machine learning systems DS and ML2 on smaller training sets, which take less time, and then to fine-tune that training with larger training sets in later cycles through the loop from Block 304 to Block 313. In some embodiments, sets T and T2 are changed to get diversity in the training of machine learning systems DS and ML2. In some embodiments, T, T2, and V are changed to reflect a change in the task categories made in block 309. In some embodiments, validation set V is changed so that V properly represents new data that has not been used before so that the performance on set V is an unbiased estimate of the performance on operational data.

Block 313 checks whether a stopping criterion is met. In this illustrative embodiment, the stopping criterion will depend on the end goal of intelligent agent IA. For example, intelligent agent IA might be trying to build an ML2 system that can recognize all the elementary categories, that is all the set of values in the set Y. However, as another example, intelligent agent IA might instead be trying to build a machine learning system that will function as a member of an ensemble. Then the goal of intelligent agent IA might be to get machine learning system to specialize and to complement the other members of the ensemble. If the stopping criterion is not met, then the process returns to Block 304 for another round of learning and growth.

Illustrative Example: Self-Driving Cars: Self-driving cars are a natural application for a system with multiple AALCs. With one or more AALCs per vehicle, the system in each vehicle continues to grow and learn. Each vehicle is semi-autonomous, which is essential for mobility with varying rates of data connectivity. On the other hand, the extensive asynchronous sharing of knowledge allows the system in each vehicle to benefit from the experience and learning of every other vehicle. Life-long learning and one-shot learning, topics to be discussed below, enable the collective knowledge of the AALCs to keep up with changing conditions, such as road construction.

Additional Details on the Learning and Growth Process: In an illustrative embodiment, the incremental growth illustrated in FIG. 3, enables the system to continue to learn and grow indefinitely, including during operational use. This capability is called "life-long" learning.

During some operational use, some of the data is explicitly or implicitly labeled. It can be explicitly labeled as a side-effect of error correction within the application task, or as an extra action by the user or a support person. It can be implicitly confirmed by allowing the user the option of correcting errors within the application, so that any output that is not corrected is implicitly confirmed. Any embodiment of the present invention that supports growing the data, for example as illustrated in blocks 304 to 308 of FIG. 3, can implement life-long learning of labeled operational data in the same way as the supervised training illustrated in FIG. 3.

During other operational use, much of the data will be unlabeled. In some embodiments, sparse feature vectors, which are trained unsupervised or semi-supervised, can be added to second stage machine learning system ML2 and can even enhance the ability for machine learning system ML2 in different asynchronous agents with learning coaches to communicate with each other. Thus, the ever-growing system can make good use of unlabeled data. Sparse feature vectors and ways they can be added to a growing neural network will be discussed in more detail in association with FIGS. 6, 13, and 14, among others.

Note that, if machine learning system DS is reasonably accurate in its recognition, then the selected set T2' will be much smaller than set T2. In many machine learning training algorithms, including stochastic gradient descent for neural networks, the amount of computation required for training is roughly proportional to the amount of training data. Therefore, it takes much less time to train machine learning system ML on set T2' than it would take to train on set T2. In addition, focusing on the errors and close calls may speed up the convergence of the iterative training, and may even lead to better performance.

A general principle of machine learning is that having more training data almost always improves performance. Some embodiments of this invention leave out DS in some or all of the AALCs and use the largest available training set from the start. Some embodiments always start with small training sets to save time in preliminary training on easier tasks. Some embodiments have some AALCs following one of these strategies and others following the other strategy. In each of these cases, it is possible for any AALC that starts with a smaller training set to incrementally grow that training set up to the largest available training set.

Policy of Intelligent Agent IA: Preferably, all of the components and design elements of AALCs are dynamic. Any of them can grow, can be changed, or even be replaced. The data sets can grow or be replaced; the machine learning systems can be trained on new data; the architecture of the machine learning systems can be changed by their respective learning coaches; the set of target categories can be changed; the selected set of input features can be changes; and either the data selection machine learning system DS and/or the second stage machine learning system ML2 may be an ensemble of machine learning systems, such that ensemble members can be added or removed. Although each of these individual actions can be done by a learning coach, in an illustrative embodiment the decision of which of these actions to take is done based on a strategy and policy controlled by intelligent agent IA. All of these changes affect the amount of diversity among the AALCs. In such embodiments, learning coach LC is only responsible for the learning performance of machine learning systems DS and ML2 in its own AALC, and intelligent agent IA and administrative agent AA are responsible for communication and coordination among the AALCs. In this illustrative embodiment, intelligent agent IA may decide not merely to make a change in some of the components of its AALC, but to create a new AALC. In any of the changes that could be made to any of the elements of AALC, intelligent agent IA may decide to have the current AALC (AALC original) spawn a copy of itself (AALC copy) and make changes in at least one of the two versions. Then, as their name implies, the two AALCs could proceed independently (or "asynchronously") of each other. Each of the two AALCs could make changes in its associated machine learning systems DS and ML2 and in its data sets T, T2, and V. Collectively, the intelligent agents could be exploring the state space of AALC configurations, seeking the eventual goal of better recognition on the full set S and in operational use.

Replacement of Data Sets and Data Selection System DS: If data set T2 is larger than data set T, and machine learning system ML2 is larger and more complex than machine learning system DS, then it is expected that machine learning system ML2 will perform better than machine learning system DS. In an illustrative embodiment of the invention, after second stage machine learning system ML2 has been trained on T2', a new larger set of data is selected to replace data set T. Learning coach LC then tests the performance of machine learning system DS and machine learning system ML2 on this new data set T. Optionally, learning coach LC also tests the performance of an ensemble of DS and ML2. If DS happens to perform best of these options, then DS is not replaced, but instead DS and ML2 are both experimentally modified by one or more of the other methods that will be described below. On the other hand, if, as expected, ML2 or the ensemble performs best, then, in this illustrative embodiment, machine learning system DS is replaced.

In another illustrative embodiment, DS is replaced by a machine learning copied from the repository RP or from the archive AR. In another illustrative embodiment, DS is incrementally grown by the methods that will be described below for growing second stage machine learning system ML2. In another embodiment, DS is replaced by a new larger machine learning system with a new architecture which is trained from scratch.

Optionally, the old data set T and/or the old data T2 are also included in the new dataset T. However, preferably the old data set T2 is completely replaced with a new randomly selected data set, which is optionally significantly larger than the former data set T2.

Change and Growth of ML2: In some embodiments, the machine learning systems eventually grow to become multi-stage classification system, as will be discussed in association with FIGS. 17 and 18.

In some embodiments, the end goal is to build a final machine learning system or an ensemble of machine learning systems that are trained on the full set of available training data S, and that classify the input into the finest set of categories, that is, where there is a separate category for each element in the set Y. In some embodiments, this end goal is achieved by eventually growing machine learning system ML2 in one of the AALCs to be that final machine learning system, or for a multiplicity of the machine learning systems ML2 to be the members of the final ensemble. In these embodiments, the machine learning systems can be grown incrementally in size and complexity and gradually trained on increasingly difficult classification tasks.

In these embodiments, the growth of the machine learning systems ML2 is the core of the process. In some of these embodiments, eventually training dataset T2 comprises all or most of the available training data. In some of these embodiments, data selection system DS is not present of does little or no reduction from dataset T2 to T2'. As dataset T2 approaches the fill size of the training data, and as the performance of machine learning system ML2 approaches its limit, it becomes increasingly important to be able to grow machine learning system ML2 incrementally in a way that at least maintains its current performance and retains the knowledge that it has learned so far. Therefore, illustrative embodiments that can grow machine learning system ML2 without degradation in performance will be discussed in detail below in association with FIGS. 5-11.

However, some illustrative embodiments follow different strategies. For these illustrative embodiments, the following list illustrates some of the alternative methods available for growing machine learning system ML2:
1) Growth by replacement with a larger machine learning system
2) Growth by adding components and retraining from scratch
3) Growth by adding components, retaining existing arc parameters without degradation in performance
4) Growth by adding components, retaining existing arc parameters regardless of performance
5) Growth by adding one or more members to an ensemble
6) Building a multi-stage classification system In method (1), the larger machine learning system may be a new architecture that is trained from scratch, or it may be a machine learning system copied from the repository RP or from another AALC. The arc weights or other learned parameters may be copied as the initial values for the replacement machine learning system ML2, or the network may be trained from scratch, as controlled by the learning coach LC or the intelligent agent IA. This method applies to any form of machine learning system.

In method (2), extra components are added to machine learning system ML2. Examples include adding more component mixtures to a mixture probability model such as a Gaussian mixture model, adding extra branch nodes to a decision tree, adding extra trees to a decision forest, adding extra arcs and nodes to a neural network, adding one or more extra layers to a deep neural network, and many others. In this method, the existing values of the learned parameters are discarded, and the system is retrained from scratch.

In method (3), extra components are added in such a way that the existing values of the learned parameters can be retained with the new, larger machine learning system at least matching the performance of the smaller system on the data on which it was trained. Further training is then done by an algorithm such as stochastic gradient descent that further improves performance, except for some uncertainty due to the sampling error in stochastic performance estimates. Examples of ways to add extra components to deep neural networks are described below for illustration purposes, although it should be recognized that the present invention is not limited to deep neural networks and that in other embodiments extra components could be added to other types of machine learning systems.

In method (4), the existing learned parameters are retained, and extra components are added without regard to whether the replacement machine learning system can be initialized to a state that matches the performance of the smaller system being replaced. In illustrative embodiments of this method, the training continues from the retained values of the existing parameters and some initialization of the new parameters, in spite of the fact that initially the performance of the expanded system may be worse than the former performance of the smaller system. Illustrative embodiments of this method may use any form of machine learning system.

Note that some illustrative embodiments may use methods (2) or (4) even for machine learning systems, such as neural networks, for which method (3) may be available. For example, the administrative agent may use method (2) or method (4) to create diversity among the AALCs. Some illustrative embodiments may use this strategy so that the diverse AALCs will be more complementary to each other when later merged in to an ensemble. Some illustrative embodiments may enhance diversity among the AALCs as part of a reinforcement learning exploration strategy. Some illustrative embodiments may do it as a tactic to avoid being stuck at a local minimum in the error cost function.

Method (5) adds members to an ensemble, which also can be done with any form of machine learning system. In some illustrative embodiments, there may even be multiple types of machine learning systems among the members of the ensemble.

As mentioned, in some embodiments, the architecture of ML2 may be changed. These changes are done under the control of the learning coach LC and the intelligent agent IA. For example, if ML2 is a decision tree or random forest, it may have its hyperparameters changed to grow it larger. If it is an ensemble it may be allowed to have additional members. If it is a neural network, it may have additional nodes and arcs added. It may even have additional layers added to make the neural network deeper. If machine learning system ML2 is not (yet) an ensemble, it may be cloned and one copy modified to create a two-member ensemble. Any of these and many other changes may be done, based on the decisions of the learning coach consistent with the policy chosen by intelligent agent IA. The intelligent agents IA can be trained by learning algorithms well known to those skilled in the art of reinforcement learning, for example by an actor-critic method, such as in A3C available from both OpenAI and Google. Techniques for growing a neural network will be discussed in more detail later.

Change of Target Categories: The set of target categories may also be changed. For example, one or more single element sets may be taken out of the "catch-all" category $C_N$. Optionally, category $C_N$, or any other multi-element category, if there are any, may be split into two or more multi-element categories. In one neural network embodiment, the new categories are associated with new nodes in the output layer and each of the new nodes is fully connected to all the nodes in the layer below the output. Similar changes can be made to the target categories in other forms of machine learning system.

In various embodiments, in addition to or in lieu of the above-mentioned changes, validation set V can also be replaced with a new random set of data.

With the new data sets for T, T2, and V, with the new machine learning system DS, and with whatever changes have been made to the architectures of ML2 and to the set of target categories, the cycle is repeated. That is, the process of training machine learning system DS on data T, using the trained system DS to classify data set T2, selecting the set T2' of errors and close calls, and training machine learning system ML2 on data set T2' is repeated. This entire process may be repeated many times, eventually growing T2 and V to encompass all of the set S, except for set asides, and growing the set of target categories to single elements sets for each of the elements of Y. Thus, each AALC, or its descendants, will grow into a full machine learning system for classifying all the elements of Y, trained on all the training data available in S.

In some image recognition tasks, the number of categories may be in the tens of thousands. In speech recognition, machine translation, and natural language processing, the number of classification categories may equal the vocabulary size, which may be in the hundreds of thousands. However, in another illustrative embodiment, the number of target categories for an individual AALC may be kept small. In this embodiment, the recognition of the full set of categories is not done by each individual machine learning system ML2, but rather by an ensemble. If the number of target categories for an AALC is small relative to the total number of categories, then the "catch-all" category can purposely be under sampled, with a representative sample that is much smaller than the full set S. This property is also true for earlier rounds of the illustrative embodiment that have already been described.

Growing ML2 and DS Without Degradation in Performance: Although some illustrative embodiments may deliberately grow machine learning systems DS and ML2 without regard to whether there is a temporary degradation in performance, for some illustrative embodiments, it is important to be able to grow machine learning systems DS and ML2 while at least retaining the performance that has been previously achieved. The following discussion introduces illustrative embodiments that can achieve this result.

Growing an Ensemble: One way to add to a machine learning system without degrading its current performance is to create or add to an ensemble. In an illustrative embodiment, a first step in growing second stage machine learning system ML2 or data selection machine learning system DS is to create a new machine learning system NewML. If the existing machine learning system ML2 or DS is not yet an ensemble, an ensemble can be created containing two members, namely the existing machine learning system and the new machine learning system NewML. If the existing machine learning system is already an ensemble, the new machine learning system NewML is added to the ensemble.

There are several illustrative examples of how to create a new machine learning system to add to an ensemble with an existing data selection machine learning system DS or an existing second stage machine learning system ML2. Some examples are listed below.
1) Copying a system from another AALC or from the repository RP
2) Building a new, larger system and training it from scratch
3) Selecting a LC-guided structural change and implementing both alternatives
4) Making a data split to grow a multi-stage system or to cause divergent training for members in an ensemble Examples (1) and (2) have already been discussed as methods by which machine learning systems DS or ML2 can be replaced by a larger machine learning system. They also can be used to create a new component to add to an ensemble.

Example (3) uses one of the capabilities of a learning coach LC that hasn't yet been discussed herein. A learning coach is a machine learning system that learns to guide the learning of a subject machine learning system. It does not learn to recognize the patterns recognized by the subject machine learning system, but instead it learns from prior experience guiding other subject machine learning systems. It learns to recognize patterns in observations of the learning process and learns to associate those patterns with the need or opportunity to make changes in the learning process. For example, the learning coach can learn to optimize the hyperparameters that control the learning process of the subject machine learning system.

As another example, the learning coach LC can learn to make structural changes in the subject machine learning system (e.g., DS or ML2). For example, adding or deleting arcs and nodes in a neural network. In an illustrative embodiment, such changes are made when learning coach LC recognizes a pattern in its observations of the learning process of the subject machine learning system that indicate that the subject machine learning system might be converging to a local minimum that it might be able to escape with a change in its structure. In this illustrative embodiment, such changes are speculative and experimental. The new system might or might not perform better than the old system. This example is an illustrative example of an opportunity for example (3) above. Learning coach LC can leave a copy of the old system as is while also creating the new system and let both of them be members of an ensemble.

An illustrative embodiment of Example (4) is to obtain any machine learning system as a data splitting system (ML_split) that classifies the current input feature space into two or more categories. A copy of machine learning system ML2 is made for each output category of ML_split. Each separate copy of ML2 is trained with supervised training for its own categories, but each copy is trained only on the data for one of the output categories of ML_split. The copies of ML2 then form an ensemble. Then an iterative process of training a data assignment system, then retraining to copies of ML2 is begun, and then retraining the data assignment, will begin, as will be discussed in more detail in association with FIGS. 17 and 18. Selecting an arbitrary classifier ML_split is given just as an illustrative example. Most embodiments will have some method of selecting an ML_split that learning coach believes will cause the copies of ML2 to diversify and specialize on each one's assigned data. In association with FIGS. 17 and 18 an embodiment of the iterative process will be described that begins with an ensemble and avoids the choice of an ML_split.

Although expanding an ensemble is simple and applies to any kind of machine learning system, there are reasons that the administrative agent AA and the intelligent agents IAs might want to also use incremental growth of individual machine learning system DS and ML2, rather than relying solely on adding to an ensemble as a means of growth. Some of these reasons are listed below:
1) For diversity of strategy and diversity among the AALCs
2) To grow very deep networks
3) To insert components that aid communication of knowledge
4) To insert components that aid regularization Reason (1), diversity, applies to all types of machine learning systems and has already been discussed in other contexts. The same reasons apply here.

The other reasons apply especially to illustrative embodiments based on deep neural networks. For example, there are deep classification problems in which any network with fewer than some minimum number of layers requires exponentially many nodes to perform the classification task, but does not require exponentially many nodes if there are at least that minimum number of layers. More broadly there are examples in which deep neural networks are substantially more efficient than shallower networks. In other examples, very deep neural networks have beaten the previous record performance of shallower networks on many industry-standard benchmarks. For all of these reasons, an intelligent agent IA might want to grow a deeper neural network rather than simply add to an ensemble.

Another reason to be able to grow a neural network is to insert a collection of nodes or arcs that are shared among multiple AALCs. In this illustrative example, the purpose of the sharing is that, with the shared structure, the AALCs have a common referent for communication and can share some of the knowledge that they learn in subsequent training. As will be discussed in detail below, the "sharing" in this illustrative example uses only a loose coupling among the instances of the shared structure, not rigid lock-step copying and synchronization. As such, it does not require a high data bandwidth to maintain this loose coupling.

Another beneficial effect of sharing internal structure is that the shared structures can be used for regularization. The regularization enhances the ability of the AALCs to share knowledge by keeping the shared structures similar to each other. It also has the effect of restricting the ability of any one of the sharing AALCs to over fit its parameters to its own training data. In some embodiments, this regularization is the mechanism for maintaining the loose coupling mentioned above. It does not require high data bandwidth.

With these goals in mind, the following discussion introduces additional methods by which a deep neural network may be incrementally grown without degradation in performance.

Other Methods of Growing Without Degradation in Performance: It has already been mentioned that the machine learning systems ML2 and DS can grow and be otherwise modified under control of learning coach LC. It makes sense to have them gradually grow as they are trained on more and more data, in successive rounds. In embodiments where the machine learning systems are neural networks, it also makes sense to grow the networks in a way that the networks will be able to share knowledge.

An illustrative embodiment of another aspect of the invention allows new elements to be added to a neural network while avoiding degradation in performance on training data. This illustrative embodiment applies to deep feed forward and deep recurrent neural networks. It even allows a full new layer to be added to the network with no degradation in performance on training data. If there is degradation in performance on validation data, learning coach LC monitors and attempts to fix the situation, for example by increasing the amount of regularization. If that fails, the intelligent agent IA returns the system to an earlier state and explores other strategies.

FIG. 4 illustrates an aspect of the invention in which an ensemble is combined into a single system. Various embodiments of the present invention can build and train ensembles. For example, (i) each AALC may build an ensemble, (ii) a single system with or without a learning coach and agent may build an ensemble, or (iii) an ensemble may be created by combining the systems built by two or more AALCs. FIG. 4 is an illustrative embodiment of a method by which any ensemble is combined into a single machine learning system, which can then be further trained to improve the joint performance of the combined subnetworks or subsystems representing the former ensemble members.

Block 401 is a neural network that is initialized to emulate the score combining or voting rule that is used to compute the output from the ensemble. If the computation used by the ensemble is any one of the functions 402, 403, or 404, then the connections from the ensemble members 411-413 are set to weights of one or zero, respectively, to select the node for that function and not select the other nodes, and neural network 401 is initialized to the identity. If some other function needs to be computed in the emulation, it is either computed directly by node 405, or node 405 is set to a linear activation function and the neural network 410 is initialized to compute the emulation function.

There may be any number of ensemble members, represented by blocks 411, 412, and 413. After, initialization to match the prior performance of the ensemble, the system illustrated in FIG. 4 is further trained to optimize the joint performance of the combined network. This training can be done by stochastic gradient descent, so the trained performance of the combined system shown in FIG. 4 is an improvement over the performance of the ensemble. Neural network 401 can back propagate the error cost function through network 401 and down to the subsystems (ensemble members) 411, 412, and 413. The ensemble members 411, 412, 413, are not necessarily neural networks. They may be any type of machine learning system that can be trained by gradient descent from the partial derivatives back propagated to them from block 401 through the nodes 402, 403, 404, and 405. The gradient descent or mini-batch based stochastic gradient descent is iteratively applied until convergence or until a stopping criterion is met. Further details of the process of using a neural network to build a system combining the members of an ensemble into a single system are described in further detail in U.S. provisional patent application Ser. No. 62/524,686, filed Jun. 26, 2017, entitled "Selective Training for Decorrelation Errors," which is incorporated herein by reference in its entirety.

FIGS. 5-11 illustrate various mechanisms for adding elements to a deep neural network without loss in performance. FIG. 5 shows the addition of a single new arc. The arc weight is initialized to zero, so there is no immediate change in the activations, so no change in performance. Although the weight is initialized to zero, in general the partial derivative will be non-zero. Thus, at the next update, the weight will be changed in the direction indicated by gradient descent. That is, it will be changing in a direction that decreases the error cost.

It is possible that, although the change made during an update is in the direction of gradient descent, the error cost may increase, for example if the step size is too large. If that happens, remedial action can be taken in the same way that it can be taken with any step of gradient descent. In the illustrative embodiment, a snapshot is taken of the network before any experimental change in the network or before any update that might make the performance worse. If the performance is worse, the update is reversed and a more conservative update is made. That is, the learning rate is lowered to make the step size smaller, and/or a larger minibatch is collected. By the definition of the gradient, if the gradient is non-zero, then there always exists a step size sufficiently small that there will be an improvement in performance at least when tested on the minibatch. In the limit of the minibatch size being the whole training set, the performance on the whole training set will be improved.

Strategies for Handling Stationary Points: When the learning process approaches a stationary point, the gradient becomes close to zero and the learning slows down. Slower learning for most of the learned parameters is appropriate if the stationary point is the desired optimum of the error cost objective function. However, the main reason for adding elements to an existing network is to increase its representation capability and thereby create a new, better optimum value, so a faster learning rate is desired. However, if an arc with weight equal to zero is added to an existing network that is at a stationary point with respect to the back-propagation computation, then the partial derivative of the error cost function must be zero with respect to every learned parameter. Thus, the partial derivative must be zero with respect to each bias, which is equal to the partial derivative of the associated node. Thus, the partial derivative of the error cost function with respect to the node activation, averaged over the minibatch, is also zero. Since the weight on each added arc is also zero, the activation of the destination node for the arc will not change. Thus, right at the stationary point there will be no learning, and near the stationary point the learning will be slow. In other words, if an arc with weight initialized to zero is added to a network that is at a stationary point, the new, expanded network will also be at a stationary point. However, it is desirable to be able to add elements and grow networks that are currently at or near a stationary point. For example, it is desirable to be able to add a layer to a network that has already been trained to convergence rather than having to restart the training from scratch for the network with the added layer.

There are several strategies for handling the slow learning near a stationary or the lack of learning right at a stationary point that can be used in various embodiments of the present invention.

Strategy 1: Just Wait—If the stationary point is local maximum, a saddle point, or a local minimum that is specific to the current minibatch, then a reasonable strategy is to simply wait for the next or a later minibatch. The stationary point is unstable, so other minibatches will have faster learning rate for the new parameters that have been added to the network.

Strategy 2: Back up Learning to an Earlier State—If the learning has converged to the global minimum or to a very good local minimum, then a strategy is to back up to an earlier state in the learning process. The earlier state should be chosen to be a point at which the performance is close to the converged performance but at which the gradient is not yet too close to zero. This strategy requires that frequent snap shots of the state of the learning process have been and put into a repository or into the archive.

Strategy 3: Adjust Biases—Another illustrative strategy is to have the learning coach intervene and arbitrarily change the biases for the nodes that are destination nodes for new arcs. In this illustrative strategy, the learning coach LC makes these bias changes on an experimental basis. The bias changes will change the activation values of the affected nodes without changing anything else in the network. The changes in the activation levels of the nodes will create non-zero partial derivatives not only for the biases, but for all the weights on arcs leading to the affected nodes, including the newly added arcs. With a non-zero weight on the new arc, gradient descent will lead to a new value for the bias that will adjust for the contribution of the new arc to the activation of its destination node. Because the network with the new arc with a non-zero weight can represent a superset of the functions represented by the network without the new arc, the learning process should lead to a new, better minimum in the error cost function. If the learning process with adjusted biases leads to parameter values with a worse error cost value, the learning coach LC can generate a new set of randomized biases and try again. After some number of failures with this strategy, it can switch to a different strategy.

Strategy 4: Try a Different Change to the Network—If the process in either strategy 3 or strategy 4 consistently converges to the same minimum in the cost function, that is with the weight on all the new arcs converging back to zero, then the learning coach can try a different addition to the network. For example, it can try a change in which even more elements are changed, so that there are more parameters available, increasing the dimension of the space of the gradient and giving more directions for a non-zero slope in the error cost function.

Strategy 5: Change Some Ordinary Nodes into Compound Nodes—As another example, added nodes can be compound nodes, such as those to be discussed below. A new compound node for which the relative weights have not yet been trained to convergence will generally cause an existing minimum to become a saddle point and thus an unstable stationary point. This change should make strategy 1 or strategy 4 successful.

Adding a Node: Continuing the discussion of additions to the network, an example technique for adding an extra node to an existing layer according to various embodiments of the present invention is shown in FIG. 6. All of its outgoing arcs have weights initialized to zero, so there is initially no change in performance. The discussion of gradient descent at the next update for an arc also applies in this case.

Adding a Subnetwork: Another way, according to various embodiments of the present invention, safely adding to the network is to add a self-contained subnetwork going back to the input layer, so that the new subnetwork does not block any existing layer. In any of its layers, this new subnetwork can have connections to nodes outside the subnetwork, with the connections initialized to zero. Useful sources for such subnetworks are subnetworks that have been discovered in the training within other AALCs, or that have been trained as stand-alone networks. Supervised training as stand-alone networks means that the nodes in the top layer of the subnetwork will have externally meaningful labels. Nodes in subnetworks or in sparse feature vectors can also acquire externally meaningful labels through active learning, or transfer learning, and to some degree by semi-supervised learning.

Adding an Extra Layer: Adding an extra layer is more complicated. Wherever the new layer is added, it separates the layer below it from the layer above it. Those two layers that used to be connected are no longer directly connected. FIG. 7 shows one of several techniques according to embodiments of the present invention for adding an extra layer. The new layer in the illustrated example comprises the six nodes in the middle layer. In this illustrative example, a portion of the nodes in the new layer (the three on the left of FIG. 7) are initialized like nodes being added to an existing layer. Another portion of the nodes of the new layer (the three on the right in FIG. 7) are initialized to exactly copy the activations of the layer below. In other words, the connections between the lower layer and this portion of the nodes of the new layer (i.e., the 3 nodes on the right-hand side in FIG. 7) are initialized to the identity matrix. The activation functions for the nodes on the right-hand side of the new layer have linear or piecewise linear activations with their biases adjusted such that, for the given input values, the activations from the lower layer are just passed through, multiplied by one. The new nodes on the left side of FIG. 7 will be trained at the next and future updates just like nodes added to an existing layer. The connections initialized to the identity matrix will also be trained based on gradient descent, for potential further improvement.

Gradient Normalization: Avoiding Vanishing and Exploding Gradients: In an illustrative embodiment of this invention, very deep neural networks can be grown by incrementally adding one layer at a time. In such embodiments, the previous network is trained to convergence, so that the new network will be at a stationary point and the strategies discussed above can be employed. In addition, the network will eventually grow to have many layers, which leads to another issue. Deep neural networks with many layers tend to exhibit a phenomenon of what are called "vanishing" or "exploding" gradients. This phenomenon gets progressively worse as the partial derivatives are back propagated through successive layers. As the partial derivatives are propagated through the layers, with each layer the average magnitude of the partial derivatives tends on average to be multiplied by a number that is roughly constant. If that constant is greater than one, then the average magnitude of the partial derivatives grows exponentially. If that constant is less than one, then the average magnitude of the partial derivatives converges to zero at an exponential rate.

This problem is even more severe when back propagating recurrent neural networks back through time. For each time-wise layer the same network is used, so the multiplicative value for one layer to the next changes even less from one time-wise to the next than from one regular layer to the next. Thus, back propagation in time is even more subject to exploding or vanishing gradients. It is a constant. Therefore, in most prior art, the number of time-wise layers for back propagation in time is very limited.

Special network architectures, such as residual networks and information highways, reduce this problem by making the effective multiplicative quasi-constant have an average value closer to one. These architectures enable much deeper neural networks before the vanishing or exploding gradient problem becomes severe.

In one aspect of this invention, gradient normalization essentially eliminates the problem of exploding or vanishing gradient for a network with many layers. Gradient normalization by layer in a deep feed forward neural network was already shown in the pseudo-code above. As shown in the illustrative embodiment in that pseudo-code, the partial derivatives in each layer are normalized by the average magnitude of the partial derivatives in the previous layer:

$$\delta_{l-1,i}(m) = \left( a_{l-1,i}(m)(1 - a_{l-1,i}(m)) \sum_{j=1}^{n_l} w_{l,i,j} \delta_{l,j}(m) \right) / s_{l-1}$$

The norm of the current layer is then computed:

$$s_l=$$

Other illustrative embodiments can use other norms, such as the L2 norm. Still other embodiments can use the average norm rather than the maximum. Another illustrative embodiment computes the maximum or average norm for the unnormalized partial derivatives for the current layer and then normalizes that layer, at the expense of an extra loop through the derivatives for the layer. Preferably, the normalization is done layer by layer. If the back propagation were done for the whole network and then the normalizing factors computed, the total normalization for some layers might lead to floating point overflow or underflow.

For back propagation through time for a recurrent neural network, a similar but separate gradient normalization can be performed for each time-wise copy of the network. In an illustrative embodiment, a time-dependent normalization is computed for the top layer, time step by time step, proceeding backwards in time along with the back propagation of the derivatives. Within each time step, a normalization is computed for each regular layer, separately from whatever normalization has been computed for that layer at other times. The normalized partial derivatives are propagated backwards through the layers for each time, and backwards through time. This double normalization enables back propagation of arbitrarily deep neural networks for arbitrarily long time intervals.

Embodiments of this invention enable these networks, deep in layers and in time, to be grown and trained incrementally.

FIG. 8 shows an additional illustrative embodiment that avoids degradation in performance when a new layer is added and that reduces the amount of normalization required. In this example, the former direct connections from the layer below to the layer above are left intact, even though with the new added layer these connections now skip a layer. In feed forward neural networks and in recurrent neural networks that have been unfolded for back propagation in time, there is no reason that feed forward connections cannot skip layers. There are no additional loops or recurrences. The activation computation and the back-propagation computation proceed just as with a network with no skipped layers. Furthermore, adding connections that skip layers reduces the problem of vanishing gradient.

Illustrative Example: Conversational Speech Recognition: Recognizing natural conversational speech is a very difficult task that has been a major machine learning benchmark with incremental improvement in performance for several decades finally leading to performance close to, or possibly exceeding the performance of human listeners. This state-of-the-art performance has required being able to grow deep neural networks with over 100 layers. Embodiments of this invention facilitate the ability to build and train such deep networks and to grow them even deeper.

Adding Sparse Feature Vectors: As another illustrative embodiment of this invention, sparse feature vectors can be created by supervised or semi-supervised learning and then shared among many AALCs, as described above. An advantage of this sharing is that, if any of the AALCs sharing a feature vector learns a label for one of the features, that label can be shared by all the other AALCs using that feature vector. Sharing feature labels is especially useful for k-of-n feature vectors with a low value of k because each feature has a significant role. Methods for supervised and semi-supervised training of autoencoders with sparse feature vectors will be discussed below.

Feature vectors with labels enable a regularization across all the networks that use the feature vector. One illustrative embodiment of this regularization is to have a repository (see FIG. 2) that records instances of subnetworks that compute the feature vector and instance of the activation of the feature vector for example input data. These examples of subnetworks and data can be collected from many different AALCs. The repository does not need to be a single central repository. It may consist of multiple sub-repositories that asynchronously collect examples and occasionally exchange data.

Illustrative Example: Natural Language Processing: In natural language processing, the words can easily be determined from the written text. However, the relationships among the words depend on their syntactic and semantic properties. These properties can be learned from the enormous amount of text that is now available on the internet. Using the techniques described here, these syntactic and semantic properties can be encoded into feature vectors and the knowledge about language can be shared among the AALCs. Implemented on a distributed system, this knowledge can be deployed in mass-market applications used by millions of end users.

Compound Nodes: FIG. 9 shows another illustrative embodiment that is useful when adding a layer to a trained system that is at a stationary point, and is also useful for incrementally growing a neural network in other ways. As illustrated, each node in the new layer to be is replaced by a compound node that combines simple nodes with activation functions of several types. In the case of a node in a new layer, one of the simple nodes is a linear or piecewise linear activation that can be initialized to the identity. In this example, another simple node has a sigmoid activation function, $\sigma(x)=1/(1+\exp(-x))$. Many other types of activation functions can also be used. For example, a compound node that includes sigmoid activation and a linear activation avoids the problem of vanishing gradient caused by the sigmoid activation approaching either zero or one. Compounds nodes can also be used to learn higher order non-linear functions of lower level features.

This illustrative embodiment of compound nodes can also be used as a means to incrementally grow the size and capabilities of machine learning system DS and ML2 when adding nodes to an existing layer or when replacing existing nodes. In that use, the additional activation types of the simple nodes can improve the ability of the network to model complex non-linear networks.

The simple nodes in a compound node can have any of the activation functions used for conventional stand-alone nodes, such as, for example: sigmoid, rectified linear unit (ReLU), parametric rectified linear unit (pReLU), tanh, piecewise linear approximation to the sigmoid, the absolute value of the difference between the input and an internal parameter, the square of that difference, or any other semi-differentiable function of the input. A simple node within a compound node can also be directly connected to the incoming arcs rather than to the sum of the values from those arcs, for example, a simple node could compute the product of the inputs, or the maximum or minimum of the inputs, or any other semi-differentiable function.

Compound nodes have a major advantage in the neural network learning process. They increase the dimensionality of the space in which the gradient is defined and calculated. This property means, for example, that they provide extra directions to move in situations in which the normal partial derivative is close to zero. For example, a compound node that has a linear node and a sigmoid node avoids "vanishing derivative" that occurs when a sigmoid function saturates at an activation close to either zero or one. A combination of a rectified linear unit and a linear unit avoids the node "dying" when all the activations in the minibatch result in an activation (and derivative) of zero.

If desired, a compound node can be heavily regularized. That is, all the weights except one can be regularized to drive the sum of their absolute values or the sum of their squares, or both, toward zero. In this case, the compound node will have behavior similar to its dominant node. However, in cases in which different behavior is needed, that behavior will be available if the need is stronger than the regularization. On the other hand, in some embodiments, the combining weights can be allowed to freely train, giving more function representation capability, which may even lead to a lower error cost.

Normalize Incoming Weights: In other embodiments according to the present invention, the incoming weights to the combining node are restricted to be non-negative and to sum to one. This restriction can be enforced implicitly without having to deal explicitly with constraints by using the representation that is used for the softmax activation of nodes. That is, each weight $w_i$ could be associated with an underlying learned parameter $x_i$ that is unconstrained. Then $w_i$ could be defined by $w_i=\exp(x_i)/\Sigma_j\exp(x_j)$. This restriction will cause the compound node to model an interpolation of its component simple nodes. Viewed another way, the compound node can, for example, model probability mixture distributions. For example, a compound node in which each simple node has a mean and a standard deviation as learned internal parameters can model a Gaussian mixture with diagonal covariance.

In another illustrative embodiment, weight normalization is applied to subsets of the incoming weights to any node. In this embodiment, the normalization constrains a norm, such as the L1 norm (the sum of the absolute values of the designated set of weights) or the L2 norm (the sum of the squares of the designated set of weights) to equal a specified constant. In this embodiment, optionally the total set of incoming weights to a node is divided into subsets with each subset normalized separately.

Normalization may also be applied in various embodiments to sets of outgoing weights on the arcs leaving a given node, with similar benefits.

Compound Nodes with Special Functions: Compound nodes with special function simple nodes, such as Gaussian kernels, and monomials, can model high dimensional feature spaces such as commonly used in kernel based machine learning systems, such as support vector machines, but are not normally used in neural networks. Modeling these high dimensional feature spaces directly as input to a neural network is too computationally expensive because of the resultant number of connections. However, using them selectively in compound nodes, according to various embodiments of the present invention, requires much less computation.

Inserting Input and Output Nodes in Any Layer: In another illustrative embodiment, nodes that behave as input nodes or nodes that behave as output nodes can be added to any layer of a deep neural network with slight modifications to the technique illustrated in FIG. 6. FIG. 10 illustrates an embodiment for adding an input node. Note that this "input" node can be added to any layer of a deep neural network, not just the normal input layer. For purposes of this embodiment, an input node is a node whose activation is forced to be an amount that is specified by some external means. That is, the activation is not determined by inputs from nodes in lower layers of the neural network. However, the new node does participate in the activation of nodes in higher layers in the network. The weights on its outgoing arcs are trained by backpropagation in the usual manner.

Note that this form of input node can have its activation be a copy of a node in the regular input layer. In other words, in this illustrative embodiment input nodes can occur in any layer of a neural network. Copying input nodes into higher layers in a deep neural network helps a deep neural network that has been grown from a network with fewer layers to retain the knowledge that was learned in training the less deep network. This is one of the techniques that enables embodiments of this invention to grow deep neural networks with additional layers without degradation in performance.

FIG. 11 illustrates an embodiment for adding one or more extra output nodes to any layer of a deep neural network.

That is, each of the new output nodes has a specified target value for each vector of input data values, as indicated in FIG. 11. This specified target value could be provided by external supervision as in normal supervised training. Alternately, it could be an output value computed by a reference network, as in transfer learning. As a special case, it could be the target output for one of the regular output nodes in the same network to which the node is being added to an internal layer. In this illustrative embodiment, the back propagation from these added nodes is multiplied by a relative importance that is initialized to an arbitrarily small value E.

Creating an output node in an internal layer, whether externally specified or with the target copied from a regular output node, helps to stabilize the training in intermediate layers. In general, having multiple objectives has a regularization effect and makes the training more robust. Having a stable target, such as the final output target, as an unchanging component of the objective helps to stabilize lower layers as the network grows with more layers added at the top. Stabilizing middle layers also assists with the regularization of node sets across multiple asynchronous agents with learning coaches, as will be described below.

Communication between AALCs: Regularization of Node Sets: One of the roles of the intelligent agent IA in an AALC is to communicate with other AALCs. However, different AALCs have different machine learning systems that have been trained on different data and may even have different network architectures. To be able to communicate with each other about their internal state, the AALCs need a common referent. FIG. 12 shows an illustrative embodiment that provides such a referent.

FIG. 12 is similar to FIG. 2, except that the repositories RP of the administrative unit have been expanded to show more detail. The AALC snapshots AS are used to restart an asynchronous agent with learning coach at an earlier stage of its training, if that is ever necessary. The learning histories LH contain a collection of more complete examples of learning histories for purposes such as using the data for reinforcement learning or for scientific study. The reference system Ref is used to provide the referents so that the AALCs can communicate with each other. The AS, LH and Ref can be stored in primary and/or secondary memory of the administrative unit computer system.

In this illustrative embodiment, the communication from one AALC to another AALC includes information associating an input data item with the vector of output values produced by the input vector by one or more reference networks. Such a vector of output values will be called "well-defined". The adjective "well-defined" is not an existing term of art or just a generic use of the phrase "well-defined". It is a phrase introduced specifically for the purpose of this discussion about the vectors of values as the basis for this form of communication among the AALCs.

For example, an important property for the communication of such a vector to be useful is that the sender and the receiver have a shared understanding of which feature corresponds to which position in the vector. If two AALCs compute estimates for the same set of features, but do not know the order in which each other lists those features in a vector, then the communication will not be effective. It is preferable, therefore, to structure the learning process to create vectors that are "well-defined" in the sense that is used here. For example, if two deep learning networks learn to classify the same set of categories, but start with different initial networks or use different learning strategies, there is no guarantee that a vector of nodes from some middle layer of the networks will represent the same features in the two networks, much less that they will be in the same order. In this illustrative embodiment, it is possible for two deep neural networks to communicate information about a well-defined feature vector even when the two networks have different architectures.

An example of a feature vector that is "well-defined" in the sense used here is the vector formed from the output nodes of a machine learning system trained with supervised training. Preferably the machine learning system will have been trained to convergence and preferably it will have been trained on a dataset of sufficient size such that performance on new data is comparable to performance on the training data. If the output categories have human-interpretable labels, the well-defined output vector will further be designated as a "well-defined feature vector with labels". This example illustrates one mechanism by which a well-defined feature vector may be created. As will be seen in the following discussion, there are other mechanisms by which a well-defined feature vector may be created.

If the machine learning systems are deep neural networks, a well-defined feature vector RFV can be used as a referent for communication if the repository contains sufficient information to compute the activations values of the nodes in the vector on new data, and if there is sufficient information to test whether node activations computed by some other network are close enough to the activation values of the referent vector.

For this example, as illustrated in FIG. 12 in the data structure in the repository, the reference feature vector RFV comprises the vector of values in the well-defined feature vector. The reference data RData is an index in the repository of a copy of the input data vector to the machine learning system that computes the well-defined feature vector. The reference machine learning system RML, is an index into the repository or the archive to a copy of the machine learning system that computes the well-defined feature vector. This copy contains enough information to reconstruct that reference system preserved exactly as it was when it computed the reference feature vector.

Note that there may be many copies of each of many machine learning systems, so these copies may be stored in the archive AR and be on secondary storage, rather than in the active repository. In this illustrative embodiment, it is preferable for the communication process to be able to compute the values in the well-defined feature vector RFV from new data that might not yet have been observed at the time that the original well-defined feature vector is created. Therefore, it is preferable to preserve a copy of the machine learning system RML that generates the well-defined feature vector RFV. If the reference machine learning system RML that originally generated the well-defined feature vector RFV is a component of an AALC, then it will have been changed by subsequent training and may have grown to be a much larger network. The archive AR preferably stored a copy of the RML before these subsequent changes.

Copying Node Set from Trained Networks: Any set of nodes (NodeSet) from any trained artificial neural network (ExampleANN) can be used as a basis for creating a well-defined feature vector RFV. In one illustrative embodiment, the node set and its entire subnetwork are copied to the repository RP as the reference machine learning system RML. In this illustrative embodiment, the subnetwork to be copied consists of all the nodes in NodeSet and all nodes in ExampleANN that directly or indirectly activate any of the nodes in NodeSet. The subnetwork architecture is copied along with the trained values of the weights on arcs in the subnetwork. The copied arcs include all arcs for which both the source node and the destination node is in the subnetwork. In some embodiments, it is preferred that all the nodes in NodeSet be in the same layer of ExampleANN.

In another illustrative embodiment, the subnetwork of NodeSet is not copied. Instead, a new network is trained as the reference network RML. This training uses a set of reference data RData, specifying a set of examples of input to ExampleANN and the corresponding activation values of the nodes in NodeSet. In this illustrative embodiment, the activation values of the nodes in NodeSet are used as target outputs for training the new network RML. The network RML is thus trained by transfer learning.

Although any NodeSet can be used as a basis for creating a well-defined feature vector RFV, some node sets will be much better than others. In ways to be discussed below, the learning coach LC, the intelligent agent IA, and the administrative agent make choices and set policies to select the more effective sets of nodes to become reference well-defined feature vectors.

Low-Dimension and Sparse Feature Vectors: Some embodiments prefer low-bandwidth feature vectors; that is feature vectors for which the activation values can be represented with a relatively small number of bits. Examples of such feature vectors include (1) feature vectors with a relatively small number of elements, (2) feature vectors, called "sparse feature vectors", in which only a relatively small number of the elements are non-zero, and (3) feature vectors in which the activations are interrelated and are determined by a relatively small number of parameters. In a sparse feature vectors the sparsity may either be achieved by training a feature vector to be relatively sparse, with a sparsity regularization, or by enforcing a constraint of sparsity. In addition, a feature vector with many activations that are non-zero, but close to zero, may have all its activations that are close to zero be truncated to zero. In one illustrative embodiment, in a node set with n nodes, the activations of all the nodes except the k nodes with the highest activations are set to 0. This process results in a sparse feature vector with k-of-n features.

Supervised and Semi-Supervised Training of Autoencoders: Besides requiring fewer bits for communication, these low-bandwidth feature vectors have additional advantages. For example, they can be trained as the bottleneck layer in an autoencoder. An autoencoder is a neural network that is trained to reproduce its input after encoding it into a low-bandwidth representation and then reproducing as closely as possible the original high bandwidth representation. An autoencoder can be trained unsupervised because it supplies its own output specification, namely to copy the input.

FIG. 13 illustrates a mechanism for supervised or semi-supervised training of an autoencoder with a sparse feature vector according to various embodiments of the present invention. The feature vector and the encoder network receive gradient descent back propagation from two objectives—the autoencoding objective of matching the input and the classification objective. With supervised training, the autoencoder learns the features that are shared by instances of the same category and learns different feature values to distinguish different categories. The back propagation from two objectives has a regularization effect and a stabilization effect. Therefore, the training illustrated in FIG. 13 will be less likely to over fit the training data. The stabilization will also tend to keep feature vectors trained in separate AALCs from drifting apart.

Semi-supervised training occurs if some of the data is unlabeled or is treated as unlabeled. On data that are unlabeled or treated as unlabeled, back propagation only occurs from the autoencoding objective. Semi-supervised learning is useful in situations in which there is a large quantity of unlabeled data. For example, the industry standard image recognition testbed, ImageNet, has somewhat more than one million annotated images. However, it has been estimated that by 2014 people were uploading about 1.8 billion images to the internet per day. Semi-supervised learning by the autoencoder also helps prevent over fitting to the labeled training data, so some embodiments of the invention can treat some data as unlabeled even though labels may be available.

In another illustrative embodiment, well-defined, low-bandwidth feature vectors are trained in inner layers of deep neural networks as part of the normal supervised training of the deep network that contains the low-bandwidth feature vector(s). This embodiment is illustrated in FIG. 14 with some additional components to stabilize the feature vector, as will be discussed below. In this embodiment, the reference machine learning system RML, placed in the repository RP includes at least the subnetwork activating the low-bandwidth feature vector. Optionally, it may also include the subnetwork of higher layers activated by the low-bandwidth feature vector. Optionally, it may include the entire network containing the low-bandwidth feature vector.

There are additional potential advantages to low-bandwidth feature vectors. For example, once low-bandwidth feature vectors have been trained, it is generally easier to get the relationship between vector position and the feature represented to stay consistent under continued training.

Clustering: In various embodiments, the feature vectors may also be clustered, using any of the many well-known clustering algorithms in machine learning. In some illustrative applications, there is a much larger quantity of unlabeled data than of labeled data. Clustering can take advantage of this unlabeled data because it can be done using unsupervised or semi-supervised learning. In one illustrative embodiment, initial clustering of a set of feature vectors is done by unsupervised k-means clustering. Then, a network is trained to compute the cluster associated with each feature vector with the network training supervised by the cluster assignments given by the k-means clustering. Then on a set of data labeled with a set of categories C, a network is trained to classify the feature vectors according to the target categories in C. The network mapping feature vectors to k-means clusters is included as a subnetwork. The k-means clustering network and the subnetwork computing the activations of the feature vector(s) are fine-tuned as part of the training of the classification into the categories in C.

Inserting Feature Vectors into Existing Networks: Feature vectors may be inserted into existing networks using the techniques illustrated in FIGS. 5, 6,7, and 8. In some embodiments, when the feature vector is inserted into an existing network, its activation subnetwork is also inserted. In some illustrative embodiments, they may be inserted as additional input nodes as illustrated in FIG. 10, or as additional output nodes as illustrated in FIG. 11.

In an illustrative embodiment in which a well-defined feature vector represented in the repository RP is inserted into a new network in an AALC, the association between positions in the vector and meaningful features is stabilized by any of several methods. For example, given the same input data, the activations of nodes in the feature vector are regularized to agree with the activations of corresponding feature vectors in the repository and/or in other AALCs. As another example, the learning rate for nodes in the feature vector maybe reduced to prevent it from changing too rapidly between instances of cross-agent regularization.

Another illustrative example of feature vector stabilization, which also applies to inserted feature vectors that are not being regularized to the repository, is to add additional stabilizing structure to the network to which the feature vector is being added, as shown in the example of FIG. 14. For example, in addition to the activation subnetwork, any sparse feature vector that has been trained as the bottleneck layer in an autoencoder may have its decoder also added, with the output of the autoencoder added to the receiving network as additional output nodes, as described above. In addition, if the new feature vector is being added to an inner layer with multiple layers above it, a copy of the output layer of the network may be added to the layer above the one to which the new feature vector is being added. As with any new inserted nodes, these additional, local, stable output objectives will help to stabilize the feature vector against changes due to additional training and growth of layers above the layer to which the feature vector is added.

Sparse Node Set in Network Architecture: According to still other embodiments of the present invention, sparse feature vectors may be included in the architecture of a deep neural network from the start, rather than being added later. In this illustrative embodiment, there is no issue of avoiding degradation in performance in a network that has already been trained. Another example in this illustrative embodiment is a neural network to which sparse feature vectors are added, or other substantial changes in the architecture are made, with the resulting expanded network being trained from scratch. For example, retraining from scratch may be the policy of the learning coach LC and intelligent agent IA to more completely explore the learning space, or it may be the policy of the administrative agent to create a new network that will have different characteristics to complement an ensemble.

Purposes of Communication: Embodiments of the present invention can use communication among the AALCs for several purposes. These purposes may overlap with purposes for which AALCs transfer network elements to and from the repository RP. Various purposes of communication are described below.

1) To keep feature vectors consistent: One purpose for communicating the activations of the nodes in a feature vector from one AALC to another or to the repository is to regularize the node activations and to keep the association between vector position and feature consistent.

2) To supply feature vector to solve a problem: In an illustrative embodiment, a purpose for copying a feature vector from one AALC to another is to solve a problem encountered while training the recipient network. In this illustrative embodiment, an intelligent agent IA may declare a "problem" with the training of a network whenever the network has a situation in which trying to correct one of more errors creates an equal or greater number of errors of the opposite type. Such a situation may commonly occur when trying to further reduce the error rate in a machine learning system that has already been well trained.

In this illustrative embodiment, the problem is characterized by the example data for the errors to be corrected plus the example data for the new errors created by an attempt to fix the original errors, together with the target classification categories. When an intelligent agent IA has so characterized such a problem, it may post the problem or send a message to one or more other AALCs and ask for help. In this illustrative embodiment, the help would be in the form of a feature vector and supporting subnetwork that performs the desired discrimination better than the network asking for help. This feature vector is inserted into the network in the AALC asking for help on an experimental basis. That is, the new feature vector is tested to see whether it improves the performance of the receiving network. The performance is evaluated on development data D2 that has not been included in the training of either the receiving network or the network supplying the feature vector.

3) To supply a feature vector to grow a network: In some illustrative embodiments, feature vectors are added to a network as a routine part of the growth of a network, as in blocks 308 and 310 of FIG. 3.

4) To supply a feature vector for general purposes: In some illustrative embodiments, a feature vector may be added to a network for a variety of purposes, for example, as part of the learning strategy of a learning coach LC. As another example, it may be part of the strategy of a learning coach LC or of an intelligent agent IA to increase the diversity of an ensemble.

5) To send a feature vector for testing: In one illustrative embodiment, an AALC may send a copy of a feature vector and supporting subnetwork to the repository RP (see FIGS. 2 and 12) or to another AALC in order to have the performance of the feature vector tested in a different environment than the one in which it was developed. This strategy is employed not only to reduce over fitting to a specific set of training data, but also to discover the feature vectors that are the most useful for the total system of multiple asynchronous agents with learning coaches.

6) Better interpretability: Sparse feature vectors not only facilitate sharing knowledge among the AALCs, it also facilitates interpretability of the internal knowledge of the machine learning systems by human users. In addition, the act of sharing this knowledge among the AALCs further facilitates its use by people. Features in a sparse feature vector can be labeled by active learning while a system is being used, especially if it is being used in an interactive application. In some embodiments, these labels can be acquired even in passive use. For example, labels can be tentatively assigned to components of a sparse feature vector with semi-supervised training. These labels can be confirmed, for example, by a system using them in an interactive application in which the user can correct an incorrectly used term. The lack of such correction provides implicit confirmation that the label has been used correctly. In embodiments in which the sparse feature vector is shared across many AALCs, if one AALC learns a label, it can be shared with all the other AALCs.

Improvements in Performance: Embodiments of the present invention can improve the performance of machine learning systems, including the improvements described below.

1) Measuring and Correcting Over Fitting: In any machine learning system with a large number of parameters a potential problem is the ability of the parameters to learn to fit a chance characteristic of the training data in a way that does not generalize to new data or to operational use. Many elements of the design of illustrative embodiments of this invention are designed to reduce this problem. In addition, an illustrative embodiment of this invention can take measurements to detect such over fitting of training data and can propose corrective action to fix the over fitting if it occurs.

This illustrative embodiment uses the development set D2 in FIG. 1. For this illustrative embodiment, additional development data is obtained to use as a development validation set V2, or a portion of D2 is set aside as V2. In this embodiment, D2 is used to measure the difference in performance of machine learning system ML2 on its training data T2 versus its performance on development set D2. If the difference in performance is considered significant under the policies of learning coach LC and intelligent agent IA, changes can be made in hyperparameters to increase the amount of regularization and reduce over fitting to training data T2. In this illustrative embodiment, the hyperparameters can include not only conventional regularization hyperparameters, such as the parameters for L1 and L2 regularization, but also novel parameters introduced in this invention that have a regularization effect, whether or not that is their primary purpose.

For example, the regularization of feature vectors across multiple AALCs is primarily to keep the assignment of feature property to position in the feature vector consistent. However, it also has a regularizing effect on each machine learning system that shares the feature vector. As another example, the multiple objectives used to stabilize feature vectors and other additions to a network have a regularization effect. The relative weight given to objectives other than the classification performance of the final output nodes is thus a regularization hyperparameter. Added output nodes, even copies into lower layers of the final output targets, has a regularization effect. Autoencoding and clustering objectives for a sparse feature vector has a regularization effect. Raising the temperature T in the following definition of a temperature-dependent sigmoid, $\sigma\rho_T(x)=1/(1+\exp(-x/T))$, has a regularizing effect. In the illustrative embodiment, all these and other hyperparameters that might affect the degree of over fitting are optimized by gradient descent to a set of values that optimize the performance on the development set D2 when these hyperparameters control the training of machine learning system ML2 on the training set T2.

Even though development set D2 is not used for training examples, this tuning of the hyperparameters to optimize performance on D2 means that performance on D2 is no longer a valid estimate of performance on validation data or in operational use. Therefore, in this illustrative embodiment, set aside data V2 is used to estimate the performance on validation data after development data D2 has been used to tune the regularization hyperparameters. The original validation set V is saved for final validation.

2) Growing Depth of Network without Limit: In illustrative embodiments of this invention, an AALC can grow its associated machine learning systems DS and ML2, as indicated in block 310 of FIG. 3. If the machine learning system is a deep neural network, the neural network can be grown by adding an entire new layer, for example by the methods illustrated in FIGS. 7 and 8. In one illustrative embodiment, this growth in depth can proceed essentially without limit. Inserting copies of input nodes in intermediate layers (see FIG. 10) reduces any undesirable side effects from having many layers, as does inserting output nodes into intermediate layers (see FIG. 11). Linear nodes or compound nodes that include linear nodes allow any node or set of nodes to be copied from any layer to any higher layer, again reducing the chance of undesirable side effects of extra layers. Finally, using gradient normalization eliminates the most common undesirable side effect, vanishing or exploding gradients.

However, even though a deep neural network can be grown to an arbitrary depth without degradation in performance, it is likely that at some depth the performance will saturate and, thereafter, the incremental improvements in performance will be small. Various embodiments of the present invention can take a number of special actions to further improve the performance when the process of merely adding to the depth seems to saturate.

3) Split Detectors (Into Detectors, Rejecters, and Don't Care): Any node in a neural network can be regarded as a detector of the patterns that activate it beyond some specified threshold, especially nodes with a sigmoid or softmax activation function. Output nodes and nodes in a feature vector are explicitly detectors of the designated classification categories or features. However, in any detection there is both positive evidence, indicating the presence of the category or feature, and negative evidence, indicating that the category or feature might not be present. In a neural network, a single, non-compound node adds the positive and negative information together as input to its activation function.

In an illustrative embodiment of this invention, a compound node feature detector can represent and learn a more nuanced decision process, as illustrated in FIG. 15. In some embodiments, the background model node is omitted. This illustrative embodiment, with a third node as a background model, is especially designed to replace an output node in a classifier that has more than two output categories or to replace a node in a sparse feature vector. A single node can only represent an either/or situation. The first (left) node in this compound node represents the fact that significant evidence exists in favor of the detection. The second (middle) node represents the fact that significant evidence exists against the detection. The third (right) node represents that no strong evidence exists either way. Each of the three nodes trains their own subnetwork. In one illustrative embodiment, the three subnetworks are copies of the subnetwork activating the single node that is being replaced, initialized with the same weights but then trained to each node's own objective. Each of the three nodes is connected to all the nodes in the next layer to which the original single node was connected, with the connection weights initialized as shown (e.g., $w_1=1$, $w_2=-1$, $w_3=0$). In some embodiments, the activations of each of the three nodes are computed independently. For example, each could be a sigmoid function. In other embodiments, the three nodes are activated as a softmax.

4) Template Nodes: In some embodiments, certain types of nodes can be used to create templates. A template in these embodiments can be a single node or a group of nodes that models a single data item. In some embodiments, the template models a single data item initially and then is trained to recognize a cluster of similar items or a category of which the original item is an example. Any set of nodes in which each node matches its inputs against a stored set of feature values can be a template. For example, a node that computes a radial basis function or a Gaussian kernel can be a template. Any node that internally stores a vector of values and computes any vector norm of the difference between that internal vector and the input values can be a template. Any node that computes the cosine of the angel between the weights on its incoming arcs and the activations of the source nodes for those arcs can be a template. If the activations and the weights are normalizing, say to have the sum of their squares be one, then the normal sum of products of weights times the incoming activations is equal to the cosine. Other than the normalization of the incoming weights and corresponding activations, this is an ordinary node and it needs no internal storage.

Any set of template nodes is capable of one-shot learning. That is, a template node or a set of template nodes can create a model from a single instance of a new category. Embodiments of the present invention can use one-shot learning either during regular training or during life-long learning while in operational use. One-shot learning is especially valuable during operational use because it provides immediate corrective learning whenever a new situation is encountered, immediately providing a way to handle the same situation if it reoccurs. One-shot learning combined with life-long learning enables a system to keep learning new things without limit. In an illustrative embodiment, life-long learning includes unsupervised, semi-supervised, or active learning that continues when a machine learning system is in operational use. One-shot learning can be used when something new is encountered that does not fit any existing categories. In operational use of an interactive application, partially supervised implicit learning can be implemented by providing a means of a user to correct errors. An uncertain output that is not corrected is thereby implicitly confirmed.

5) Enhancing Output Nodes with Multiple Detect/Reject Networks: In an illustrative embodiment, illustrated in FIG. 16, each original output node is connected to multiple detection nodes trained to detect the category represented by the output node and is also connected to multiple rejecter nodes trained to reject that hypothesis when there is strong evidence that it is false. In this illustrative embodiment, both the detectors and the rejecters are trained to be sparsely activated. It is assumed in this embodiment that there are many output categories and that each is true a small minority of the time.

The two combining nodes may have a special extra term in the objective function that they back propagate to their input nodes. Namely, they can back propagate a substantial extra penalty when two or more of their input nodes are falsely activated. The activations of the detectors are expected to be highly correlated because they are all detecting the same event and are expected to be correct most of the time. However, the extra penalty tends to train them to make their errors conditionally uncorrelated, or perhaps even negatively correlated. That is, they can be correlated in the sense that they mostly agree when they are correct, but no two of them should agree when they are wrong. The rejecters can be handled in a fashion similar to the detectors.

In other embodiments of this concept, there may be a different trigger threshold for this extra penalty. For example, when there is a large ensemble of detectors and the individual detectors have a higher error rate, there may be a higher threshold before the extra penalty is imposed.

In some instances, the output node or a pair of output nodes have to decide between two confusable categories. According to various embodiments of the present invention, in this situation the rejecters are replaced by detectors for one of the categories, e.g., the second category. In this embodiment, the individual errors rates may be higher because the categories are confusable. In this case, the answer can be determined by the number of detectors activated in each of the two sets of detectors, or some related measure, such as the sum of their activation levels. In such embodiments, the extra penalty can be imposed when the difference between the correct and incorrect measures is less than some specified margin.

6) Tie Weights of Feature Vector Subnetworks Together: This invention, in various embodiments, can run on a distributed system. In such embodiments, the communication channels among the AALCs preferably have a relatively low data bandwidth. This can be achieved, as described above, because the sparse feature vectors require relatively few bits to be characterized and the communication of regularization information is only occasional. However, in some embodiments, there may be many AALCs on a single system with no inter-system communication required.

In an illustrative embodiment, some of the feature vectors and their subnetworks are tied more closely than just by regularization. In fact, all the weights are tied to being identical to each other. For example, all copies of the same feature vector in a single neural network or all copies among the networks in an ensemble in a single AALC could have their weights tied to being identical. The decision to tie weights together would be under the control of learning coach LC. In another embodiment, learning coach LC could do a blend, adjusting the frequency and size of the regularization parameter until the related subnetworks are nearly identical, and perhaps blending that into forcing them to be identical. Forcing them to be identical could be a reversible decision since the ties could be broken at any future time and the weights could drift. This action could be taken, for example, if two tied networks were to be copied to systems that would be physically separated and needed to communicate over limited bandwidth communication channels.

7) Merging Networks and Creating Ensembles: In illustrative embodiments of this invention, many AALCs run asynchronously and each gradually acquires a unique body of knowledge. An illustrative embodiment of the invention allows the unique knowledge acquired by two or more AALCs to be combined. In one embodiment, the ML2 classifiers of two or more AALCs are simply assembled into an ensemble classifier. The ensemble is then retrained on all the training data in the union of the T2 training sets. This embodiment may be adequate if all the AALCs being combined have the same set of classification categories, or close enough to that such that the exceptions can be treated as missing votes.

In another embodiment, the ensemble can be combined into a single neural network similar to the one shown in FIG. 4. In this embodiment, the special combining nodes would include nodes that deal with categories that are sets of elementary categories. The special nodes would create unions and intersections and other set theoretic functions of the categories of the individual classifiers and would compute various forms of combined score. The neural network above the ensemble would learn how to select among and combine the scores from the special functions.

In this embodiment, the set of categories and the training sets could be kept small for the machine learning systems in AALCs that are intended for later merging. Keeping these systems and their training sets small would reduce the total amount of computation required, while at the same time allowing most of the preliminary learning to be done asynchronously on distributed systems.

8) Low Level Features: In another illustrative embodiment, the effective number of low level features varies from one AALC to another. On the one hand the intelligent agent IA and the learning coach LC may select a subset of the input nodes to be active. This selection is made to reduce the amount of computation and to increase the diversity among the machine learning systems in an ensemble, which may either be an ensemble within a single AALC or a future ensemble to be created by combining components from multiple AALCs.

To increase the ability to learn and represent non-linear functions as well as to increase the diversity, extra nodes that compute special activation functions may be added just above the input layer or in another low layer. These nodes can compute special functions such as the product of two inputs or a radial basis function, or a Gaussian kernel around a vector of input nodes, or compute these functions from other low level nodes. However, to limit the complexity and amount of computation, this illustrative embodiment only selects a small subset of all such functions. For example, it may only choose a small subset of all pairs of input nodes to have specialty nodes compute the product of the pair. The learning coach LC may choose the pairs at random, or it may first observe the activations of the input nodes during a previous round of training and choose pairs have significant positive or negative correlation, or it may choose pairs specified by the intelligent agent IA. The intelligent agent IA may specify the selection of pairs for the purpose of exploration, that is, to find by trial and error which pairs contribute to improved performance, or the intelligent agent IA may choose the pairs to select based on the performance of the pairs in machine learning systems in other asynchronous agents with learning coaches. In addition, both the learning coach LC and the intelligent agent IA may make their specification based on prior experience with other machine learning tasks.

For any addition of extra nodes or other change in the network architecture, a snapshot of the previous system can be archived, in the archive AR of the administrative unit for example, as can be frequent snapshots of the system after the change for enough time to assess the performance of the change. If the change is assessed to degrade the performance, then the system is restored to the snap shot of the system before the change. If the change is assessed to be a significant improvement, it can be recorded and recommended to other AALCs. Thus, collectively a set of AALCs can explore the space of higher power functions while only having a small subset of those functions active in any one machine learning system during the exploratory design process.

Enhancing the Performance of Ensembles: Referring back to FIG. 1, either data selection machine learning system DS or second stage machine learning system ML2 may be an ensemble rather than a single classification system, especially as the classification task approaches the final goal and the machine learning system ML2 approaches its best performance. In an illustrative embodiment of this invention, an ensemble machine learning system ML2 has some advantages that are not available in the training and operation of a generic ensemble. For example, as has been mentioned with respect to several illustrative examples described above, administrative agent AA and the intelligent agents IA may have policies that enhance the collective diversity of the machine learning systems LM2 across the set of AALCs. This diversity will tend to lead to more complementary ensemble members and to better performance of the ensemble. In addition, well-defined, sparse feature vectors enable the machine learning systems ML2 to learn from each other, contributing to better individual and joint performance.

As an illustrative embodiment of this invention, this sharing of knowledge via regularized feature vectors can be applied to any ensemble neural network machine learning system, not just to systems based on incremental growth and AALCs.

Multi-stage Machine Learning Systems: FIGS. 17 and 18 illustrate embodiments of a multi-stage machine learning system. Multi-stage machine learning systems are described in further detail in U.S. provisional patent application Ser. No. 62/486,650, which is incorporated herein by reference in its entirety. An AALC in embodiments of this invention comprise an optional data selection system DS and a second stage machine learning system ML2. However, the combination of a data selection system DS and a second stage machine learning system ML2 does not make a complete multi-stage machine learning system.

As shown in FIG. 17, in a complete multi-stage machine learning system, there is a multiplicity of final stage machine learning systems, and the data assignment system assigns every item of data to at least one of the final stage machine learning systems. In contrast, in an AALC, second stage machine learning system ML2 may be a single system rather than, say, an ensemble, and data selection system, if present and doing any non-trivial selection, will only select a proper subset T2' of the data T2.

However, as already described, machine learning system ML2 may be an ensemble. Any ensemble may be built into a multi-stage machine learning system as shown in FIGS. 17 and 18. One illustrative embodiment of such a process is as follows. This illustrative procedure uses supervised learning, but is also to some extent self-organizing.

First, a set of labeled training data is obtained. Although not essential, it is preferable that this training data are data that have been set aside and not used in the original training of the ensemble. The members of the ensemble become the initial final stage machine learning systems 1704a to 1704e. The performance of each member of the ensemble is measured, using the labeled training data. Then, based on these performance measurements, the data assignment machine learning systems (1701 and 1702) are trained by supervised learning to attempt to assign each item of training data to the final stage machine learning system 1704 that is most likely to classify that data item correctly. In this supervised training, the data assignment machine learning systems are not told the correct classification but only the performance measurement of the assigned final stage machine learning system 1704. Note that these performance measurements may be smoothed and regularized, so they do not merely reflect a correct vs incorrect answer by the assigned final stage machine learning system.

Once the data assignment systems 1701 and 1702 have been trained, the roles are reversed. Each final stage machine learning system 1704 is then trained by supervised training using only the data that has been assigned to it by the data assignment system. In some embodiments, multi-stage learning coach and data management system 1705 in FIG. 17 may copy the assigned data to more than one final stage machine learning system. Learning coach and data management system 1705 may also add noise, that is, changes to the assignments made by the data assignment system. These interventions by learning coach and data management system 1705 are done to regularize the training of the final stage machine learning systems 1704 and to make it more robust against noise.

FIG. 18 illustrates a multi-stage machine learning system in which the sources of data are physically distributed. For example, a mass market product with millions of end users might have the first stage data collection done as part of an application that runs on each end user's local system, which might be a computer, a tablet, a smart phone, a smart watch, or a simple embedded device. The final stage machine learning systems may also be physically distributed. The number of final stage machine learning systems may also be equal to the number of end users or at least proportional to the number of end users. Because the amount of data processed by each final stage machine learning system in a set of n final stage machine learning system is only proportional to 1/n of the total data, the amount of processing per final stage machine learning system remains constant. Thus, the total number of end users and the proportional number of final stage machine learning systems can grow without limit.

Because the machine learning systems share knowledge, the overall system is more than just an ensemble. Illustrative embodiments of AALCs can utilize the total computational power of all the distributed processing systems in FIG. 18. The already impressive separate capabilities of AALCs and large multi-stage machine learning system can greatly enhance each other when combined.

Embodiments of the present invention can be used to improve many different types of machine learning systems, including deep neural networks, in a variety of applications. For example, embodiments of the present invention can improve recommender systems, speech recognition systems, and classification systems, including image and diagnostic classification systems, to name but a few examples.

In one general aspect, therefore, the present invention is directed to a methods and computer systems for improving a base deep neural network. The method comprises training the base deep neural network with training data to a desired performance criteria, such as to or near (within a threshold of) convergence or a stationary point. The base deep neural network comprises an input layer, an output layer, and a first hidden layer that is between the input and output layers. The first hidden layer comprises a first node that in turn comprises a first incoming arc and a first outgoing arc. The method further comprises structurally changing the base deep neural network to create an updated deep neural network, such that the updated deep neural network has no degradation in performance relative to the base deep neural network on the training data. The method further comprises subsequently training the updated deep neural network.

In various embodiments, the computer system may comprise a first set of one or more processors for training the base deep neural network with training data to the desired performance criteria. The computer system may also comprise a second set of processors that are for (i) structurally changing the base deep neural network to create an updated deep neural network, wherein the updated deep neural network has no degradation in performance relative to the base deep neural network on the training data; and (ii) subsequently training the updated deep neural network.

In various implementations, structurally changing the base network can comprises adding a new arc to the first node without degrading the performance of the updated neural network relative to the base neural network, such as illustrated in FIG. 5. The new arc could be an incoming arc to the new node or an outgoing arc from the new node. A weight for a new incoming arc may be initially set to zero prior to subsequently training the updated deep neural network. A weight of the new outgoing arc may be initially set to zero prior to subsequently training the updated deep neural network. The structural change to the base network may also comprise adding a second node to the first hidden layer without degrading the performance of the updated neural network relative to the base neural network, such as illustrated in FIG. 6. The second node may have at least one incoming arc and at least one outgoing arc, a weight for each of the at least one outgoing arcs of the second node may be initially set to zero prior to subsequently training the updated deep neural network. Alternatively, an activation of the second node is not determined by other nodes in the base deep neural network (e.g., an input node). In other embodiments, the second node has a specified target value for each vector of input data values to the second node (e.g., an output node).

In other embodiments, structurally changing the base network may comprise adding a second hidden layer to the base neural network, such that the second hidden layer is between the input and output layers and is different from the first hidden layer, without degrading the performance of the updated neural network relative to the base neural network, as illustrated in FIG. 7. In various implementations, the second hidden layer is between the first hidden layer and the output layer; the second hidden layer comprises a plurality of nodes; the plurality of nodes of the second hidden layer comprises a first set of one or more nodes and a second set of one or more nodes; the number of nodes in the second set of one or more nodes in the second hidden layer equals the number of nodes in the first hidden layer, such that each node in the second set of one or more nodes in the second layer has a corresponding node in the first hidden layer; each node in the first set of one or more nodes in the second hidden layer comprises an incoming arc and an outgoing arc; each node in the second set of one or more nodes in the second hidden layer comprises a same number of incoming and outgoing arc as its corresponding node in the first hidden layer, such that each node in the second set of one or more nodes in the layer has a same number of incoming and outgoing arcs as its corresponding node in the first hidden layer; a weight for each outgoing arc of the one or more nodes in the first set of nodes of the second hidden layer is initially set to zero prior to subsequently training the updated deep neural network; and weight for each incoming arc to the one or more nodes in the second set of nodes of the second hidden layer are initially set to a value of one. In yet other implementations, the second hidden layer is between the first hidden layer and the output layer; the second hidden layer comprises one or more nodes; each of the one or more nodes of the second hidden layer comprises an incoming arc and an outgoing arc; a weight for each outgoing arc of the one or more nodes in the second hidden layer is initially set to zero prior to subsequently training the updated deep neural network; and outgoing arcs from the first hidden layer skip the second hidden layer prior to subsequently training the updated deep neural network.

Still further, structurally changing the base network may comprise replacing the first node in the hidden layer with a compound node. The compound node may comprise a detector node and a rejecter node. In various implementations, the base neural network comprises an upper sub-neural network that comprises the output layer and a lower sub-neural network that comprises the input layer, such that the hidden layer is between the upper and lower sub-neural networks. In that case, structurally changing the base network may further comprise replicating the lower sub-neural network such that there are at least a first lower sub-neural network and a second lower sub-neural network, such that the detector node of the compound network the hidden layer is connected to the upper sub-neural network and the first lower sub-neural network and the rejecter node of the compound network the hidden layer is connected to the upper sub-neural network and the second lower sub-neural network, as shown in FIG. 9. The compound node may further comprise a third node, in which case structurally changing the base network may further comprise replicating the lower sub-neural network such that there is a third lower sub-neural network and such that the third node of the compound network the hidden layer is connected to the upper sub-neural network and the third lower sub-neural network.

In various implementations, methods of the present invention can further comprise, after structurally changing the base deep neural network, validating the updated deep neural network with validation data. Upon detection of a degradation in performance of the updated deep neural network on the validation data relative to the base deep neural network, the method can further comprise: learning, by a machine-learning learning coach a feature change for the updated deep neural network to remedy the degradation in performance of the updated deep neural network on the validation data relative to the base deep neural network; and implementing the feature change in the updated deep neural network.

The base deep neural network can be, for example, a deep feed forward neural network or a deep recurrent neural network.

In another general aspect, the present invention is directed to an autoencoder that comprises: a lower sub-network that comprises an encoder network; a low-bandwidth feature vector as a bottleneck layer of the autoencoder; and an upper sub-network, such that the low-bandwidth feature vector is between the lower and upper-sub-networks. The upper sub-network comprises a machine-learning classifier network and a decoder network for the encoder network of the lower sub-network. Also, the low-bandwidth feature vector and the encoder network are trained through gradient descent back propagation from the decoder network and the machine-learning classifier network.

In various implementations, the autoencoder can be trained through supervised training or through semi-supervised training. Also, the lower sub-network may comprise a first sub-neural network in addition to the encoder network, and the upper sub-network may comprise a second sub-neural network in addition to the machine-learning classifier network and the decoder network.

In another general aspect, the present invention is directed to a method of training a machine learning system, where the machine learning system comprises a machine learning classifier ML2 for classifying inputs to a set of target classifications TC. According to various embodiments, the method comprises the steps of: [a] training a data selection machine learning system DS on a first training data set T1, where T1 is a subset of S, where S is a set of labeled training examples, and where T1≠S; [b] after training on T1, classifying, with the data selection machine learning system DS, a second training data set T2 to two or more of the target classifications TC, where T2 is a subset of S and wherein T2≠T1≠S; [c] selecting a subset, T2', of the second training data set T2, for training ML2, wherein the subset T2' is selected based on an error parameter, such that if a score for the classification of a training example of T2 by DS is incorrect and within the error parameter of a score for a correct classification, the training example is included in the subset T2'; and [d] training ML2 on T2'. The method also comprises the step of incrementally growing an aspect of the machine learning system until a stopping criterion is met, wherein steps [a] through [d] are repeated with the incrementally grown aspect of the machine learning system until the stopping criterion is met.

According to various implementations, the incrementally grown aspect comprises a structural change to ML2 and/or DS. For example, where ML2 or DS comprise deep neural networks, the structural change may comprise adding a new node, adding a new arc, and/or adding a new layer to ML2 or D2, as the case may be. As another example, ML2 may comprise an ensemble of machine learning classifiers and the structural change may comprise adding a new ensemble member to ML2. Also, the incrementally grown aspect could comprise increasing the set of target classifications TC for ML2 or changing the set S of labeled training examples.

According to yet other implementations, the machine learning system comprises a learning coach LC and the method further comprises specifying, by the learning coach system, the error parameter for each iteration of steps [a] through [d] above. The learning coach LC itself may be a machine learning system. The machine learning system may also comprise an intelligent agent that performs the step of setting the stopping criterion.

In another general aspect, the present invention is directed to a system that comprises a machine learning classifier ML2 and a data selection machine learning system D2 that selects training examples for training ML2, such that ML2 is grown without classification performance degradation.

Both ML2 and DS may have respective sets of learned parameters that are adjustable to minimize an objective function that represents a cost of classification errors by ML2 and DS, respectively. In such an implementation, the machine learning system may further comprise a machine-learning learning coach LC that: (i) is trained to recognize patterns in observations of machine learning processes; (ii) based on observations in the training of ML2 and/or DS, sets one or more of the learned parameters of ML2 and/or DS (e.g., one or more hyperparameters of ML2 and/or DS) according to an objective of an objective function of the LC. In that connection, the LC preferably has a different objective function than ML2 and DS. The machine learning system may further comprise an intelligent agent in communication with the LC that transmits the objective to the LC. Also, the learning coach LC may determine how to grow ML2 and/or DS without classification performance degradation.

The classifier ML2, the data selection system DS, and the learning coach LC may each be implemented with one or more processors (e.g., GPU and/or AI accelerator) for implementing their respective machine-learning functions.

In another general aspect, the machine learning system comprises a plurality of networked asynchronous agents, where each asynchronous agent comprises the machine learning classifier ML2 and the data selection machine learning system D2 that selects training examples for training ML2. In such implementations, at least two of the classifiers ML2 have different machine learning structures (e.g., different deep neural networks). Also, at least one of the plurality of networked asynchronous agents further comprises the machine-learning learning coach LC and the machine-learning intelligent agent IA. The system may further comprise a machine-learning administrative agent that is in communication with each of the plurality of network asynchronous agents, where the administrative agents controls which of the plurality of network asynchronous agents are active and inactive at a given time.

In another general aspect, the present invention is directed to systems and methods for incremental development of a machine learning system that is not limited to systems with multiple asynchronous agents. Incremental development can be used in any machine learning system that can dynamically grow its network. The novel aspect is repeatedly incrementally increasing some attribute of the system or of the training process with testing of each incremental change as to whether the change has made an improvement. The incremental change may be in any of the following: (1) the size and complexity of the machine learning system, such as the number of layers, the number of nodes, or the number of arcs in a neural network, (2) the amount of training data, (3) the number of input features in each data item, (3) the number of categories being distinguished, (4) the number of members in an ensemble, (5) any other attribute that limits the type of machine learning system being trained. Any of these steps of incremental development may be done even while training an individual system.

In another general aspect, the present invention is directed to systems and methods for combining an ensemble into a single network, such as described above in connection with FIG. 4. A novel aspect includes using a neural network to combine an ensemble into a single large network and then to train that combined system to optimize its joint performance. Lacking such a combining network, prior art methods for building and training ensembles do not directly measure or optimize the joint performance. At best they use surrogates that tend to improve the performance as new members are added to the ensemble, but without retraining all the ensemble members jointly. The combining network can be initialized to do the same computation as the unmerged ensemble. Subsequent gradient descent training will improve the performance, making the performance of the large single network better than the performance of the ensemble.

In another general aspect, the present invention is directed to systems and methods for supervised training of an auto-encoder, such as described above in connection with FIG. 13. A novel aspect includes training the autoencoder using multiple objectives. Having multiple objectives achieves two improvements over normal training of an auto-encoder: (1) reducing the number of degrees of freedom, for a regularization effect, and (2) stabilizing the training of the feature vector, making it easier to keep multiple feature vectors that represent the same features in synchronization, whether the multiple feature vectors are in the same network or are in different networks, perhaps associated with different asynchronous agents.

In another general aspect, the present invention is directed to systems and methods for stabilizing a feature vector, as described above in connection with FIG. 14. There are at least two aspects of FIG. 14 that are novel. First is building and training a low-bandwidth knowledge representation, such as a vector of feature nodes, and using that low-bandwidth knowledge representation to communicate and share knowledge among sub-systems of a distributed machine learning system. Second is stabilizing the training of a set of nodes to satisfy multiple objectives simultaneously.

In another general aspect, the present invention is directed to systems and methods that utilize detector/rejector compound node, such as described above in connection with FIGS. 15 and 16. Such nodes separate detection from rejection, rather than merely interpreting lack of detection as rejection. For example, detection can be modeled as discrimination among three alternatives: (1) detection, (2) rejection, or (3) the no-decision or background case. Both the detectors and the rejecters could be trained to be sparsely activated.

In another general aspect, the present invention is directed to systems and methods that add input and output nodes to inner layers, such as described above in connection with FIGS. 10 and 11.

In another general aspect, the present invention is directed to systems and methods that implement the iterative learning and growth cycles described herein. Machine learning systems, such as an AALC, a single machine learning system, or a member of an ensemble, may be grown using one or combination of two or more of the following growth techniques: (i) selectively growing the data set by selecting errors and close calls (see e.g., blocks 304-308 of FIG. 3); (ii) growing the number of output categories (see e.g., block 309); (iii) increasing the size of the network (see e.g., block 310); and/or (iv) adding additional input features (see e.g., block 311). With any of these techniques, the new system can be initialized to match the previous performance, instead of having to start the retraining from the beginning.

In another general aspect, the present invention is directed to systems and methods for normalizing the weights on the incoming arcs of a node. The incoming weights can be normalized, for example, by: (i) having the weights sum to a constant, e.g., one; (ii) scaling the weights to have an L1 norm of 1; and/or (iii) scaling the weights to have an L2 norm of 1. Alternately, or in addition, the weights on the outgoing arcs from a node may be normalized.

In another general aspect, the present invention is directed to the life-long and one-shot learning techniques described herein, which can be applied to single machine learning systems/networks and to members of an ensemble. Aspects of the present invention are also directed to refining multi-state machine learning systems, such as described in connection with FIGS. 17 and 18.

The systems described herein, including AALCs and administrative units, can be implemented with computer hardware and software. For example, they could be part of an integrated computer system (e.g., a server or network of servers) that has multiple processing CPU cores. For example, in the case of an AALC, one set of cores could execute the program instructions for ML2, another set for the learning coach LC, and so on. The program instructions could be stored in computer memory that is accessible by the processing cores, such as RAM, ROM, processor registers or processor cache, for example. In other embodiments, some or all of the systems could execute on graphical processing unit (GPU) cores, e.g. a general-purpose GPU (GPGPU) pipeline. GPU cores operate in parallel and, hence, can typically process data more efficiently that a collection of CPU cores, but all the cores execute the same code at one time. In other embodiments, some or all of the individual AALCs could be part of a distributed computer system. Data may be shared between the various systems using suitable data links, such as data buses (preferably high-speed data buses) or network links (e.g., Ethernet).

The software for the various machine learning systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, M L; and examples of scripting languages include Bourne script, JavaScript, Python, Ruby, Lua, PHP, and Perl.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method of training a neural network, the neural network comprising one or more output nodes, wherein the one or more output nodes comprises at least a first output node, the method comprising iteratively training, by a computer system that comprises one or more programmed processing cores, the neural network with a set of training data items, wherein the iterative training comprises:
for each of n=1, . . . , N training iterations:
in a forward computation phase, computing, by the computer system, in a forward computation through the neural network, activation values for nodes of the neural network for an nth training data item in the set of training data items, wherein computing the activation values comprises computing an activation value for the first output node; and
in a back-propagation phase, computing, by the computer system, partial derivatives of a cost function for an objective for the neural network through the neural network for the nth training data item; and
after the forward computation phase and the back-propagation phase for the Nth training iteration, computing, by the computer system updated learned parameters for the neural network based on the computed partial derivatives for each of the n=1, . . . , N training iterations,
wherein:
the first output node is connected to $D_1$ detector nodes, wherein $D_1$ is greater than or equal to three;
each of the $D_1$ detector nodes is trained to detect a category represented by the first output node; and
the n=1, . . . , N training iterations comprise:
for each of the n=1, . . . , N training iterations, determining by the computer system whether any of the $D_1$ detector nodes are falsely activated; and
for each of the n=1, . . . , N training iterations for which there is a determination that two or more of the $D_1$ detector nodes are falsely activated, including a first penalty term with the cost function for the two or more of the $D_1$ detector nodes that are falsely activated in the computing of the partial derivatives in the back-propagation phase.

2. The method of claim 1, wherein:
the first output node is connected to $R_1$ rejecter nodes, wherein $R_1$ is greater than or equal to three;
each of the $R_1$ rejecter nodes is trained to reject a category represented by the first output node; and
the n=1, . . . , N training iterations comprise:
for each of the n=1, . . . , N training iterations, determining by the computer system whether any of the $R_1$ rejecter nodes are falsely activated; and
for each of the n=1, . . . , N training iterations for which there is a determination that two or more of the $R_1$ rejecter nodes are falsely activated, including a second penalty term with the cost function for the two or more of the $R_1$ rejecter nodes that are falsely activated in the computing of the partial derivatives in the back-propagation phase.

3. The method of claim 1, wherein:
the neural network further comprises a second output node;
the second output node is connected to $D_2$ detector nodes, where $D_2$ is greater than or equal to three;
each of the $D_2$ detector nodes is trained to detect a category represented by the second output node; and
the n=1, . . . , N training iterations comprise:
for each of the n=1, . . . , N training iterations, determining by the computer system whether any of the $D_2$ detector nodes are falsely activated; and
for each of the n=1, . . . , N training iterations for which there is a determination that two or more of the $D_2$ detector nodes are falsely activated, including the first penalty term with the cost function for the two or more of the $D_2$ detector nodes that are falsely activated in the computing of the partial derivatives in the back-propagation phase.

4. A method of training a neural network, the neural network comprising one or more output nodes, wherein the one or more output nodes comprises at least a first output node, the method comprising iteratively training, by a computer system that comprises one or more programmed processing cores, the neural network with a set of training data items, wherein the iterative training comprises:
for each of n=1, . . . , N training iterations:
in a forward computation phase, computing, by the computer system, in a forward computation through the neural network, activation values for nodes of the neural network for an nth training data item in the set of training data items, wherein computing the activation values comprises computing an activation value for the first output node; and
in a back-propagation phase, computing, by the computer system, partial derivatives of a cost function for an objective for the neural network through the neural network for the nth training data item; and
after the forward computation phase and the back-propagation phase for the Nth training iteration, computing, by the computer system updated learned parameters for the neural network based on the computed partial derivatives for each of the n=1, . . . , N training iterations,
wherein:
the first output node is connected to $R_1$ rejecter nodes, wherein $R_1$ is greater than or equal to three;
each of the $R_1$ rejecter nodes is trained to reject a category represented by the first output node; and
the n=1, . . . , N training iterations comprise:
for each of the n=1, . . . , N training iterations, determining by the computer system whether any of the $R_1$ rejecter nodes are falsely activated; and
for each of the n=1, . . . , N training iterations for which there is a determination that two or more of the $R_1$ rejecter nodes are falsely activated, including a penalty term with the cost function for the two or more of the $R_1$ rejecter nodes that are falsely activated in the computing of the partial derivatives in the back-propagation phase.

5. The method of claim 4, wherein:
the neural network further comprises a second output node;
the second output node is connected to $R_2$ rejecter nodes, where $R_2$ is greater than or equal to three;
each of the $R_2$ rejecter nodes is trained to detect a category represented by the second output node; and
the n=1, . . . , N training iterations comprise:
for each of the n=1, . . . , N training iterations, determining by the computer system whether any of the $R_2$ rejecter nodes are falsely activated; and
for each of the n=1, . . . , N training iterations for which there is a determination that two or more of the $R_2$ rejecter nodes are falsely activated, including the penalty term with the cost function for the two or more of the $R_2$ rejecter nodes that are falsely activated in the computing of the partial derivatives in the back-propagation phase.

6. A computer system comprising:
one or more processor cores; and
a memory in communication with the one or more processor cores, wherein the memory stores computer instructions that when executed by the one or more processor cores, cause the one or more processor cores to train a neural network, wherein:
the neural network comprising one or more output nodes;
the one or more output nodes comprises at least a first output node;
the computer instructions, when executed by the one or more processor cores, cause the one or more processor cores to train the neural network by iteratively training the neural network with a set of training data items by:
for each of n=1, ..., N training iterations:
in a forward computation phase, computing, in a forward computation through the neural network, activation values for nodes of the neural network, including an activation value for the first output node, for an nth training data item in the set of training data items; and
in a back-propagation phase, computing, partial derivatives of a cost function for an objective for the neural network through the neural network for the nth training data item; and
after the forward computation phase and the back-propagation phase for the Nth training iteration, updating learned parameters for the neural network based on the computed partial derivatives for each of the n=1, ..., N training iterations,
wherein:
the first output node is connected to $D_1$ detector nodes, wherein $D_1$ is greater than or equal to three;
each of the $D_1$ detector nodes is trained to detect a category represented by the first output node;
for each of the n=1, ..., N training iterations, the one or more processor cores are programmed to:
determine whether any of the $D_1$ detector nodes are falsely activated; and
for each of the n=1, ..., N training iterations for which there is a determination that two or more of the $D_1$ detector nodes are falsely activated, include a first penalty term with the cost function for the two or more of the $D_1$ detector nodes that are falsely activated in the computing of the partial derivatives in the back-propagation phase.

7. The computer system of claim 6, wherein:
the first output node is connected to $R_1$ rejecter nodes, wherein $R_1$ is greater than or equal to three;
each of the $R_1$ rejecter nodes is trained to reject a category represented by the first output node; and
for each of the n=1, ..., N training iterations, the one or more processor cores are programmed to:
determine whether any of the $R_1$ rejecter nodes are falsely activated; and
for each of the n=1, ..., N training iterations for which there is a determination that two or more of the $R_1$ rejecter nodes are falsely activated, include a second penalty term with the cost function for the two or more of the $R_1$ rejecter nodes that are falsely activated in the computing of the partial derivatives in the back-propagation phase.

8. The computer system of claim 6, wherein:
the neural network further comprises a second output node;
the second output node is connected to $D_2$ detector nodes, where $D_2$ is greater than or equal to three;
each of the $D_2$ detector nodes is trained to detect a category represented by the second output node; and
for each of the n=1, ..., N training iterations, the one or more processor cores are programmed to:
determine whether any of the $D_2$ detector nodes are falsely activated; and
for each of the n=1, ..., N training iterations for which there is a determination that two or more of the $D_2$ detector nodes are falsely activated, include the first penalty term with the cost function for the two or more of the $D_2$ detector nodes that are falsely activated in the computing of the partial derivatives in the back-propagation phase.

9. A computer system comprising:
one or more processor cores; and
a memory in communication with the one or more processor cores, wherein the memory stores computer instructions that when executed by the one or more processor cores, cause the one or more processor cores to train a neural network, wherein:
the neural network comprising one or more output nodes;
the one or more output nodes comprises at least a first output node;
the computer instructions, when executed by the one or more processor cores, cause the one or more processor cores to train the neural network by iteratively training with a set of training data items by:
for each of n=1, ..., N training iterations:
in a forward computation phase, computing, in a forward computation through the neural network, activation values for nodes of the neural network, including an activation value for the first output node, for an nth training data item in the set of training data items; and
in a back-propagation phase, computing partial derivatives of a cost function for an objective for the neural network through the neural network for the nth training data item; and
after the forward computation phase and the back-propagation phase for the Nth training iteration, updating learned parameters for the neural network based on the computed partial derivatives for each of the n=1, ..., N training iterations,
wherein:
the first output node is connected to $R_1$ rejecter nodes, wherein $R_1$ is greater than or equal to three;
each of the $R_1$ rejecter nodes is trained to reject a category represented by the first output node;
for each of the n=1, ..., N training iterations, the one or more processor cores are programmed to:
determine whether any of the $R_1$ rejecter nodes are falsely activated; and
for each of the n=1, ..., N training iterations for which there is a determination that two or more of the $R_1$ rejecter nodes are falsely activated, include a penalty term with the cost function for the two or more of the $R_1$ rejecter nodes that are falsely activated in the computing of the partial derivatives in the back-propagation phase.

10. The computer system of claim 9, wherein:

the neural network further comprises a second output node;

the second output node is connected to $R_2$ rejecter nodes, where $R_2$ is greater than or equal to three;

each of the $R_2$ rejecter nodes is trained to detect a category represented by the second output node; and for each of the n=1, . . . , N training iterations, the one or more processor cores are programmed to:

for each of the n=1, . . . , N training iterations, determine whether any of the $R_2$ rejecter nodes are falsely activated; and for each of the n=1, . . . , N training iterations for which there is a determination that two or more of the $R_2$ rejecter nodes are falsely activated, include the penalty term with the cost function for the two or more of the $R_2$ rejecter nodes that are falsely activated in the computing of the partial derivatives in the back-propagation phase.

* * * * *